US012613215B2

(12) United States Patent     (10) Patent No.:   US 12,613,215 B2

Kobayashi et al.          (45) Date of Patent:     Apr. 28, 2026

(54) ELECTROLYTE ANALYSIS TEST STRIP, ELECTROLYTE ANALYSIS DEVICE, AND ELECTROLYTE ANALYSIS METHOD

(71) Applicant: OMRON HEALTHCARE CO., LTD., Muko (JP)

(72) Inventors: Tatsuya Kobayashi, Kyoto (JP); Hideyuki Yamashita, Kyoto (JP); Maya Makita, Kyoto (JP); Kazuya Kitayama, Kyoto (JP); Satoshi Nakajima, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 163 days.

(21) Appl. No.: 18/581,512

(22) Filed: Feb. 20, 2024

(65) Prior Publication Data

US 2024/0295523 A1     Sep. 5, 2024

Related U.S. Application Data

(63) Continuation of application No. PCT/JP2021/044754, filed on Dec. 6, 2021.

(51) Int. Cl.
    *G01N 27/333*       (2006.01)
(52) U.S. Cl.
    CPC ................................. *G01N 27/333* (2013.01)
(58) Field of Classification Search
    CPC ........................ G01N 27/333; G01N 27/3272
    See application file for complete search history.

(56) References Cited

U.S. PATENT DOCUMENTS 5,234,568 A    8/1993   Tomita
5,320,732 A  *   6/1994   Nankai .............. G01N 27/3272
                                              204/406

(Continued)

FOREIGN PATENT DOCUMENTS

JP       63-096455 U     6/1988
JP       03-127252 U    12/1991

(Continued)

OTHER PUBLICATIONS

Official Communication issued in International Patent Application No. PCT/JP2021/044754, mailed on Jun. 6, 2024, 5 pages.

(Continued)

*Primary Examiner* — Alexander S Noguerola
(74) *Attorney, Agent, or Firm* — Keating & Bennett, LLP

(57) ABSTRACT

The present invention provides an electrolyte analysis test strip for measuring a concentration of ions contained in an electrolyte. The electrolyte analysis test strip includes a substrate extending in one direction. An ion sensitive electrode is provided in specific regions on a side of one end in the one direction on a main surface of the substrate. A main extraction electrode extends from the ion sensitive electrode to a side of an other end. A solution detection electrode is provided in a proximal region in a manner separated from the main extraction electrode, and is for detecting whether or not the solution detection electrode is in contact with the electrolyte. An auxiliary extraction electrode extends from the solution detection electrode to the side of the other end in a manner separated from the main extraction electrode.

7 Claims, 17 Drawing Sheets

(56)                 References Cited

U.S. PATENT DOCUMENTS

| | | | |
|---|---|---|---|
| 5,628,890 A * | 5/1997 | Carter | C12Q 1/001 |
| | | | 600/347 |
| 2003/0203498 A1* | 10/2003 | Neel | G01N 27/3272 |
| | | | 436/95 |
| 2005/0224345 A1* | 10/2005 | Taniike | G01N 33/4875 |
| | | | 204/403.01 |
| 2007/0138026 A1 | 6/2007 | Fujiwara et al. | |
| 2007/0205114 A1* | 9/2007 | Mathur | G01N 27/3274 |
| | | | 205/792 |
| 2011/0276278 A1 | 11/2011 | Ishige et al. | |
| 2013/0168247 A1 | 7/2013 | Iwamoto | |
| 2013/0168265 A1* | 7/2013 | Iwamoto | G01N 27/28 |
| | | | 205/781.5 |
| 2014/0105788 A1* | 4/2014 | Iwamoto | G01N 27/27 |
| | | | 422/82.02 |
| 2014/0209485 A1 | 7/2014 | Ohgami et al. | |
| 2017/0038331 A1* | 2/2017 | Macfie | G01N 27/3272 |
| 2018/0136160 A1* | 5/2018 | Chumbimuni-Torres | |
| | | | G01N 27/3335 |

| | | | |
|---|---|---|---|
| 2020/0116664 A1 | 4/2020 | Abeyrathne et al. | |
| 2023/0168219 A1* | 6/2023 | Vastarey | G01N 33/54386 |
| | | | 204/403.01 |

FOREIGN PATENT DOCUMENTS

| | | |
|---|---|---|
| JP | 2011-158483 A | 8/2011 |
| JP | 2013-032945 A | 2/2013 |
| JP | 2013-137218 A | 7/2013 |
| JP | 2014-095675 A | 5/2014 |
| JP | 2015-224904 A | 12/2015 |
| JP | 2016-004027 A | 1/2016 |
| JP | 6127460 B2 | 5/2017 |
| WO | 2010/052867 A1 | 5/2010 |

OTHER PUBLICATIONS

Official Communication issued in International Patent Application No. PCT/JP2021/044754, mailed on Jan. 25, 2022.

* cited by examiner

Fig. 4

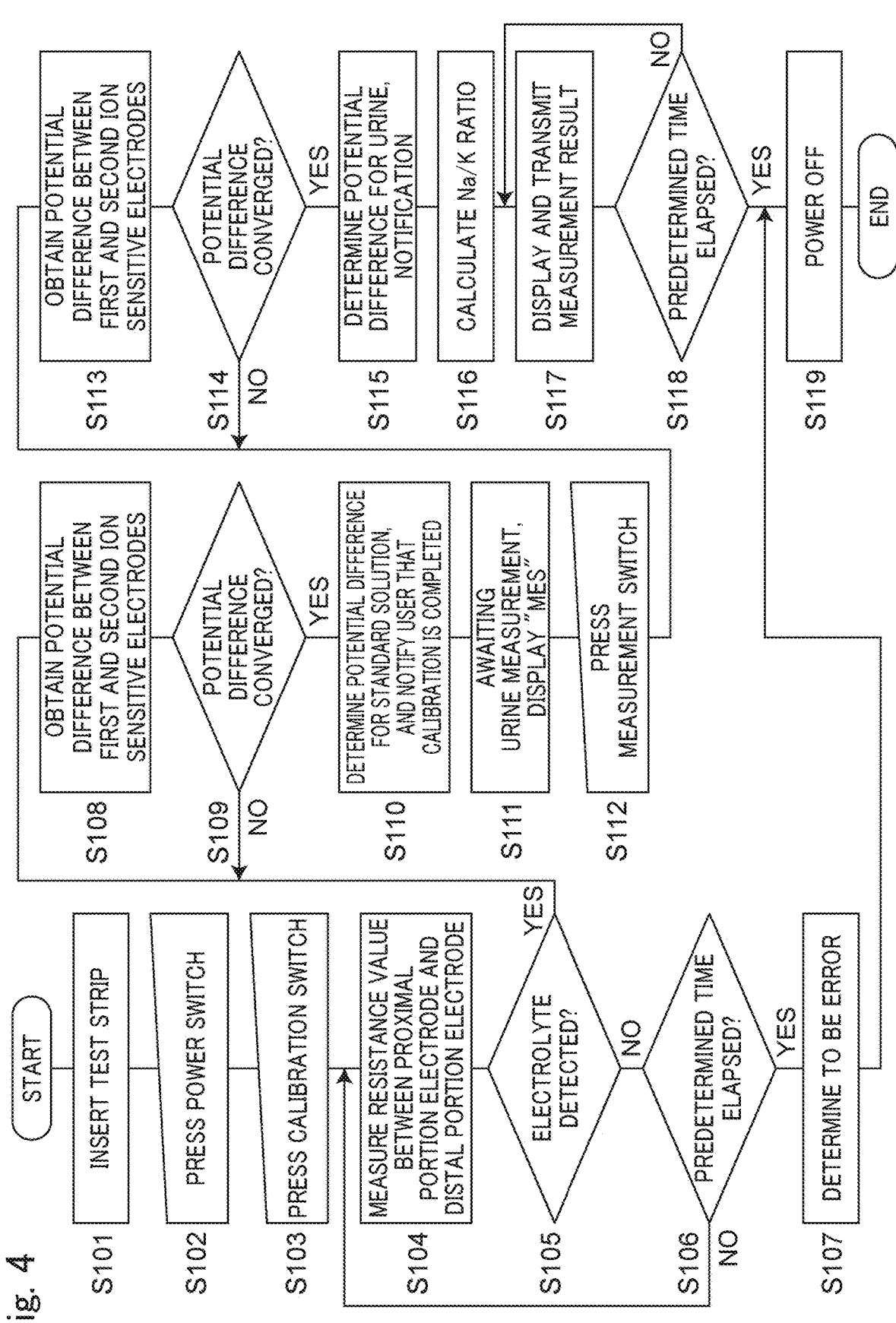

START

S101 INSERT TEST STRIP

S102 PRESS POWER SWITCH

S103 PRESS CALIBRATION SWITCH

S104 MEASURE RESISTANCE VALUE BETWEEN PROXIMAL PORTION ELECTRODE AND DISTAL PORTION ELECTRODE

S105 ELECTROLYTE DETECTED?

NO

S106 PREDETERMINED TIME ELAPSED?

NO

YES

S107 DETERMINE TO BE ERROR

YES

S108 OBTAIN POTENTIAL DIFFERENCE BETWEEN FIRST AND SECOND ION SENSITIVE ELECTRODES

S109 POTENTIAL DIFFERENCE CONVERGED?

NO

YES

S110 DETERMINE POTENTIAL DIFFERENCE FOR STANDARD SOLUTION, AND NOTIFY USER THAT CALIBRATION IS COMPLETED

S111 AWAITING URINE MEASUREMENT, DISPLAY "MES"

S112 PRESS MEASUREMENT SWITCH

S113 OBTAIN POTENTIAL DIFFERENCE BETWEEN FIRST AND SECOND ION SENSITIVE ELECTRODES

S114 POTENTIAL DIFFERENCE CONVERGED?

NO

YES

S115 DETERMINE POTENTIAL DIFFERENCE FOR URINE, NOTIFICATION

S116 CALCULATE Na/K RATIO

S117 DISPLAY AND TRANSMIT MEASUREMENT RESULT

S118 PREDETERMINED TIME ELAPSED?

NO

YES

S119 POWER OFF

END

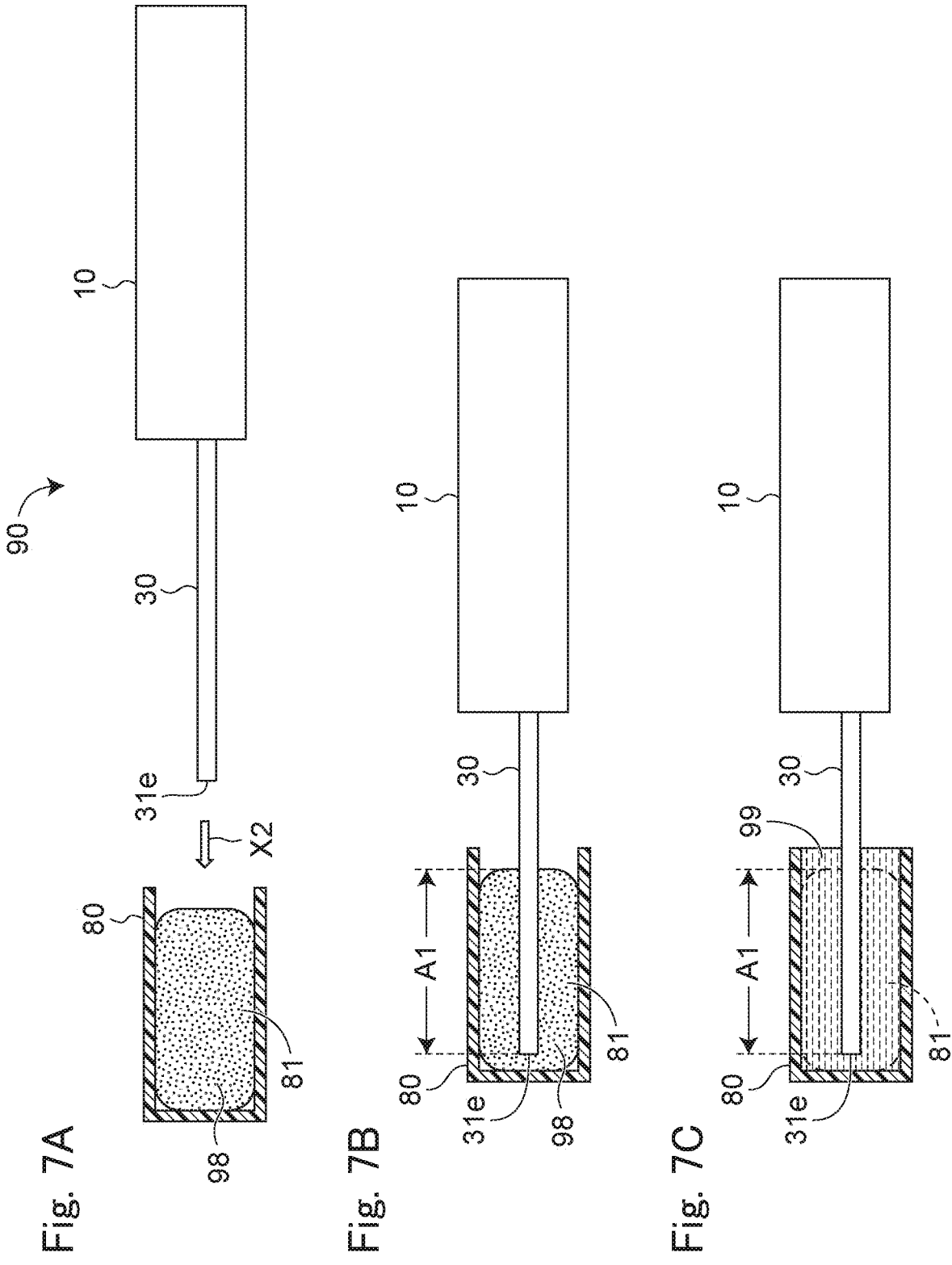

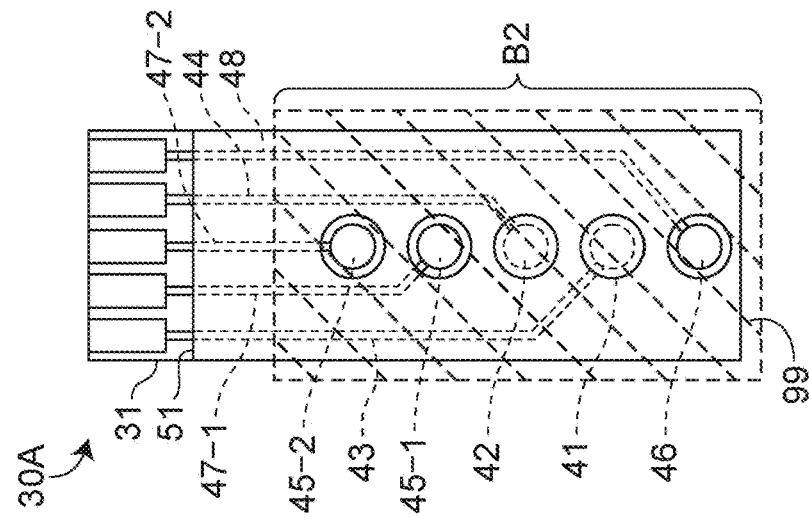
Fig. 10C
Fig. 10B
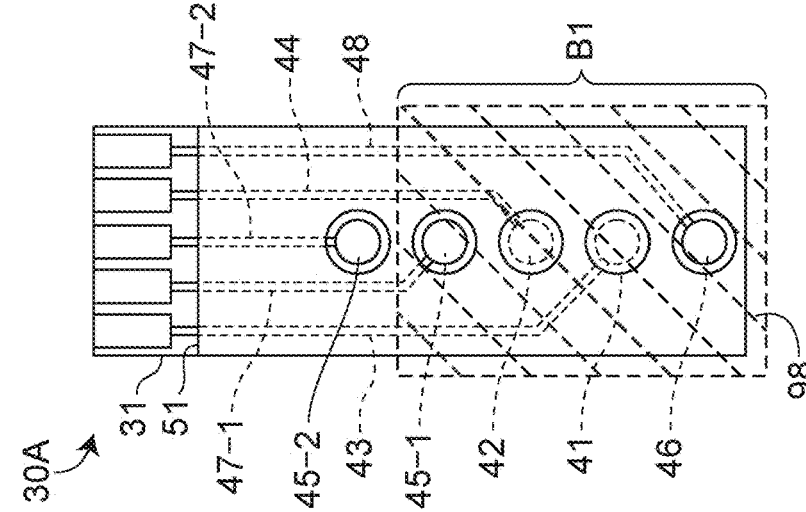
Fig. 10A

ELECTROLYTE ANALYSIS TEST STRIP, ELECTROLYTE ANALYSIS DEVICE, AND ELECTROLYTE ANALYSIS METHOD

CROSS-REFERENCE TO RELATED APPLICATIONS

This is a continuation application of International Application No. PCT/JP2021/044754, with an International filing date of Dec. 6, 2021, the entire content of which is hereby incorporated by reference.

TECHNICAL FIELD

The present invention relates to an electrolyte analysis test strip, and more particularly to a test strip on which an ion sensitive electrode for measuring the concentration of ions contained in an electrolyte is mounted. The present invention also relates to an electrolyte analysis device and an electrolyte analysis method including such an electrolyte analysis test strip to measure the concentration of ions contained in an electrolyte.

BACKGROUND ART

Conventionally, as an electrolyte analysis test strip of this type, for example, as disclosed in Patent Document 1 (JP 6127460 B2), there is known a sensor head including, on a substrate, a first ion selective electrode that selects a first ion species and produces a potential corresponding to a concentration of the first ion species, and a second ion selective electrode that selects a second ion species and produces a potential corresponding to a concentration of the second ion species. With the sensor head attached to a main body (on which a CPU is mounted) of an electrolyte analysis device, an electrolyte (a standard solution whose concentration ratio is known, or a measurement target solution such as urine) is brought into "contact" with a region on the sensor head where the first and second ion selective electrodes are provided, and the CPU calculates a potential difference between the first ion selective electrode and the second ion selective electrode as a concentration ratio between the first ion species and the second ion species. Disclosed in the same document is that, when bringing the solution into "contact" with the first and second ion selective electrodes, the solution may be sprinkled on the first and second ion selective electrodes or the first and second ion selective electrodes may be immersed in the solution. If a way of use in which the electrolyte is sprinkled on the first and second ion selective electrodes is employed, a user need not prepare a container to put a solution each time of use. This is convenient for the user.

SUMMARY OF THE INVENTION

When a user brings an electrolyte into contact with a region on the sensor head where the first and second ion selective electrodes are provided, it is necessary to make the electrolyte integrally cover the first and second ion selective electrodes in order to obtain a correct measurement result. The sensor head is intended to be disposable and is made small. In Patent Document 1, the dimensions of a substrate are set such that, for example, 50 mm in X direction and 20 mm in Y direction in plane directions, and the thickness is set to about 200 μm. Thus, for example, in a way of use in which the electrolyte is sprinkled on a region of the sensor head where the first and second ion selective electrodes are provided, there is a problem that it is difficult for a user to visually determine whether or not the electrolyte is in contact with the first and second ion selective electrodes (hereinafter, collectively referred to as "ion sensitive electrodes"). When a measurement is performed in a state where it is uncertain whether or not the electrolyte is in contact with the ion sensitive electrodes, reliability of measurement result is questionable.

An object of the present invention is to provide an electrolyte analysis test strip on which an ion sensitive electrode for measuring the concentration of ions contained in an electrolyte is mounted, and configured to be capable of determining whether or not the electrolyte is in contact with the ion sensitive electrode so as to cover the ion sensitive electrode. Another object of the present invention is to provide an electrolyte analysis device and an electrolyte analysis method that include such an electrolyte analysis test strip and can measure the concentration of ions contained in the electrolyte in a state confirmed that the electrolyte is in contact with the ion sensitive electrode so as to cover the ion sensitive electrode.

In order to achieve the object, in a first aspect, an electrolyte analysis test strip of the present disclosure is an electrolyte analysis test strip for measuring a concentration of ions contained in an electrolyte, the electrolyte analysis test strip comprising:

a substrate extending in one direction from one end to an other end;

an ion sensitive electrode that is provided in a specific region on a side of the one end in the one direction on a main surface of the substrate, and is for measuring a concentration of the ions;

a main extraction electrode extending from the ion sensitive electrode to a side of the other end;

a solution detection electrode that is provided in a proximal region located between the specific region and the other end in the one direction on the main surface in a manner separated from the main extraction electrode, and is for detecting whether or not the solution detection electrode is in contact with the electrolyte; and an auxiliary extraction electrode extending from the solution detection electrode to the side of the other end in a manner separated from the main extraction electrode, wherein the solution detection electrode includes a proximal portion electrode provided in the proximal region, and a distal portion electrode that is provided in a distal region located between the specific region and the one end in the one direction on the main surface, and is for detecting whether or not the distal portion electrode is in contact with the electrolyte, and the auxiliary extraction electrode extends from each of the distal portion electrode and the proximal portion electrode to the side of the other end in a manner separated from each other.

The "electrolyte" broadly means a solution containing at least one ion species.

The "main surface" of the substrate means a plate surface that spatially expands and is not an end surface.

The "side of the one end" means a side close to the one end, of the one end and the other end, regarding the one direction. The "side of the other end" means a side close to the other end, of the one end and the other end, regarding the one direction.

To bring the electrolyte into "contact" with the electrolyte analysis test strip (in particular, the solution detection electrode), a user (typically, a subject) may sprinkle the electrolyte on the electrolyte analysis test strip so as to integrally cover from the one end to the proximal region, or may immerse the electrolyte analysis test strip in the electrolyte from the one end to the proximal region.

In a second aspect, an electrolyte analysis test strip of the present disclosure is an electrolyte analysis test strip for measuring a concentration of ions contained in an electrolyte, the electrolyte analysis test strip comprising:

a substrate extending in one direction from one end to an other end;

an ion sensitive electrode that is provided in a specific region on a side of the one end in the one direction on a main surface of the substrate, and is for measuring a concentration of the ions;

a main extraction electrode extending from the ion sensitive electrode to a side of the other end;

a solution detection electrode that is provided in a proximal region located between the specific region and the other end in the one direction on the main surface in a manner separated from the main extraction electrode, and is for detecting whether or not the solution detection electrode is in contact with the electrolyte; and an auxiliary extraction electrode extending from the solution detection electrode to the side of the other end in a manner separated from the main extraction electrode, wherein the solution detection electrode includes a first proximal portion electrode and a second proximal portion electrode that are provided in the proximal region in a manner separated from each other, and the auxiliary extraction electrode extends from each of the first proximal portion electrode and the second proximal portion electrode to the side of the other end in a manner separated from each other.

In a third aspect, an electrolyte analysis device of the present disclosure is an electrolyte analysis device for measuring a concentration ratio between a first ion species and a second ion species contained in an electrolyte, the electrolyte analysis device comprising:

an electrolyte analysis test strip; and a main body, wherein the electrolyte analysis test strip includes a substrate extending in one direction from one end to an other end, an ion sensitive electrode that is provided in a specific region on a side of the one end in the one direction on a main surface of the substrate, and is for measuring a concentration of ions, a main extraction electrode extending from the ion sensitive electrode to a side of the other end, a solution detection electrode that is provided in a proximal region located between the specific region and the other end in the one direction on the main surface in a manner separated from the main extraction electrode, and is for detecting whether or not the solution detection electrode is in contact with the electrolyte, and an auxiliary extraction electrode extending from the solution detection electrode to the side of the other end in a manner separated from the main extraction electrode, wherein the electrolyte contains a first ion species and a second ion species different from each other, the ion sensitive electrode includes a first ion sensitive electrode and a second ion sensitive electrode that are provided in the specific region in a manner separated from each other, the first ion sensitive electrode producing, when brought into contact with the electrolyte, a first potential corresponding to a concentration of the first ion species, the second ion sensitive electrode producing, when brought into contact with the electrolyte, a second potential corresponding to a concentration of the second ion species, and the main extraction electrode includes a first main extraction electrode and a second main extraction electrode that respectively extend from the first ion sensitive electrode and the second ion sensitive electrode to the side of the other end in a manner separated from each other, and the main body includes a connector including contact electrodes that correspond to and come into contact with the first main extraction electrode, the second main extraction electrode, and the auxiliary extraction electrode, respectively, when the side of the other end of the electrolyte analysis test strip is inserted in the connector, a solution detection processing unit that detects, via the auxiliary extraction electrode, that the electrolyte is brought into contact with the solution detection electrode when the electrolyte comes into contact with the solution detection electrode in a mounted state in which the side of the other end of the electrolyte analysis test strip is inserted in the connector, and a calculation unit that calculates, triggered by a detection of the electrolyte coming into contact with the solution detection electrode, a concentration ratio between the first ion species and the second ion species contained in the electrolyte, based on a potential difference between the first potential obtained through the first main extraction electrode and the second potential obtained through the second main extraction electrode.

In a fourth aspect, an electrolyte analysis method of the present disclosure is an electrolyte analysis method for measuring a concentration ratio between the first ion species and the second ion species contained in the electrolyte using the electrolyte analysis device of the third aspect, wherein the calculation unit of the electrolyte analysis device is configured to wait, triggered by the detection of the electrolyte coming into contact with the solution detection electrode, until the potential difference between the first potential obtained through the first main extraction electrode and the second potential obtained through the second main extraction electrode converges, to perform a calibration based on a converged potential difference between the first potential and the second potential, and to calculate the concentration ratio between the first ion species and the second ion species using a parameter obtained by the calibration, and the electrolyte analysis method includes:

inserting the side of the other end of the electrolyte analysis test strip in the connector to establish the mounted state; and in the mounted state, performing an operation of bringing a standard solution containing the first ion species and the second ion species at a predetermined concentration ratio into contact with the main surface of the electrolyte analysis test strip so as to integrally cover from the one end to the proximal region to cause the solution detection processing unit to detect, via the auxiliary extraction electrode, that the electrolyte has come into contact with the solution detection electrode, and further causing, triggered by the detection of the electrolyte coming into contact with the solution detection electrode, the calculation unit to perform the calibration based on the potential difference between the first potential and the second potential obtained for the standard solution.

Here, "calibration" means a processing of obtaining a parameter necessary for calculating a concentration ratio between the first ion species and the second ion species for a measurement target solution based on a potential difference between the first and second potentials obtained for a standard solution whose concentration ratio is known.

In a fifth aspect, an electrolyte analysis device of the present disclosure is an electrolyte analysis device for measuring a concentration of ions contained in an electrolyte, the electrolyte analysis device comprising:

an electrolyte analysis test strip; and a main body, wherein the electrolyte analysis test strip includes a substrate extending in one direction from one end to an other end, an ion sensitive electrode that is provided in a specific region on a side of the one end in the one direction on a main surface of the substrate, and is for measuring a concentration of the ions, a main extraction electrode extending from the ion sensitive electrode to a side of the other end, a solution detection electrode that is provided in a proximal region located between the specific region and the other end in the one direction on the main surface in a manner separated from the main extraction electrode, and is for detecting whether or not the solution detection electrode is in contact with the electrolyte, and an auxiliary extraction electrode extending from the solution detection electrode to the side of the other end in a manner separated from the main extraction electrode, and the main body includes a connector including contact electrodes that correspond to and come into contact with the main extraction electrode and the auxiliary extraction electrode, respectively, when the side of the other end of the electrolyte analysis test strip is inserted in the connector, a solution detection processing unit that detects, via the auxiliary extraction electrode, that the electrolyte is brought into contact with the solution detection electrode when the electrolyte comes into contact with the solution detection electrode in a mounted state in which the side of the other end of the electrolyte analysis test strip is inserted in the connector, and a calculation unit that calculates, triggered by a detection of the electrolyte coming into contact with the solution detection electrode, a concentration of ions contained in the electrolyte based on a potential obtained through the main extraction electrode.

BRIEF DESCRIPTION OF DRAWINGS

FIG. 4 is a diagram illustrating a flow of an electrolyte analysis method in which a subject as a user measures a concentration ratio between sodium ions and potassium ions in urine as an electrolyte using the electrochemical sensor.

FIGS. 7A to 7C are figures more specifically illustrating a part of the procedure of the electrolyte analysis method (corresponding to FIGS. 5D to 6A).

FIG. 10A is a view illustrating a planar layout of an electrolyte analysis test strip of an exemplary modification. FIGS. 10B to 10C are figures for explaining a measurement procedure using the electrolyte analysis test strip in FIG. 10A.

FIG. 13A is a view illustrating a planar layout of an electrolyte analysis test strip of yet another exemplary modification. FIG. 13B is a view illustrating a planar layout of an electrolyte analysis test strip of yet another exemplary modification.

DETAILED DESCRIPTION

Hereinafter, embodiments of the present invention will be described in detail with reference to the drawings.

First Embodiment (Schematic Configuration of Electrochemical Sensor)

Figures 1A, 1B:
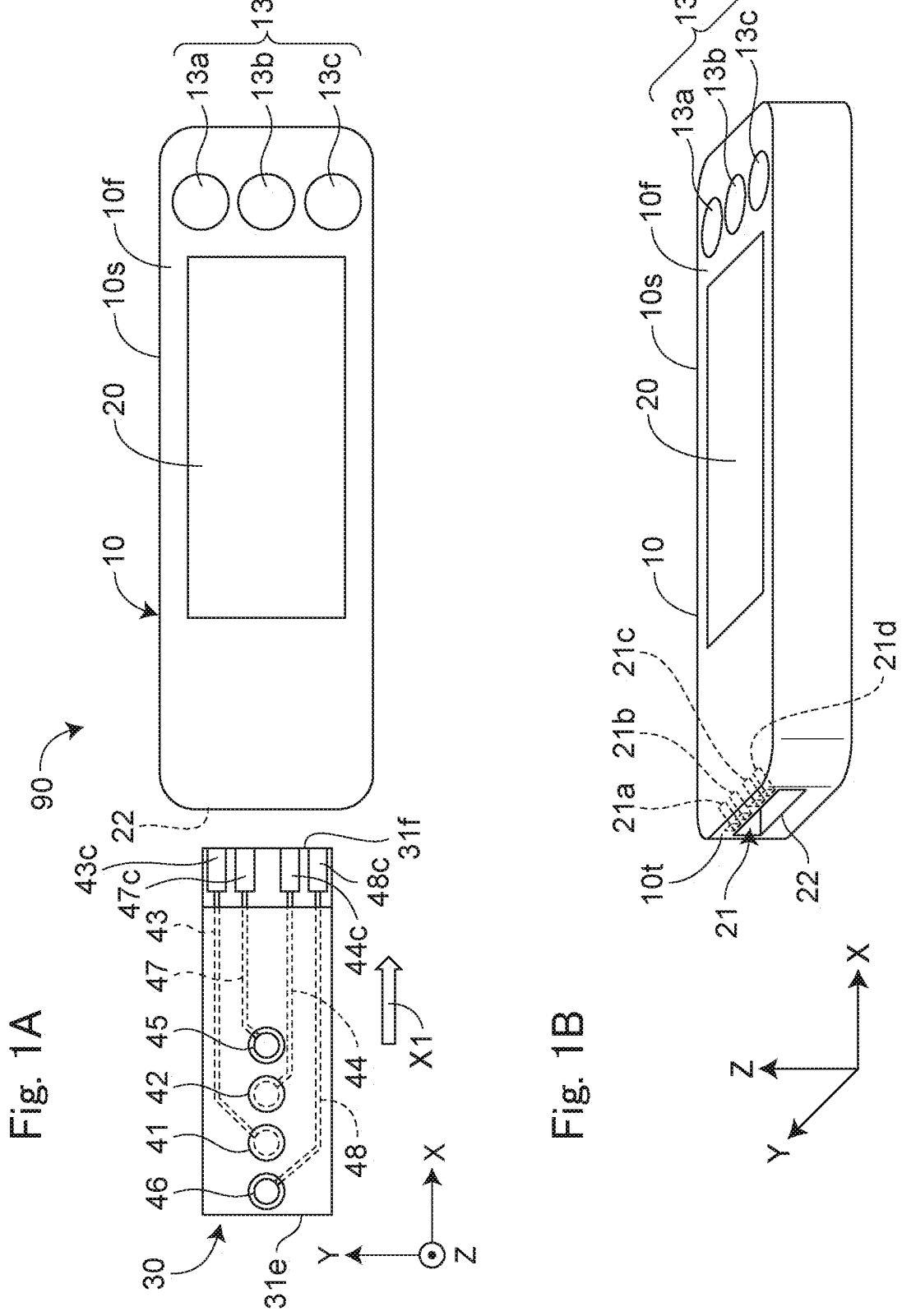
FIG. 1A is a view illustrating a schematic configuration of an electrochemical sensor as an electrolyte analysis device according to a first embodiment of the present invention.
FIG. 1B is a view schematically illustrating a main body of the electrolyte analysis device as viewed obliquely.

FIG. 1A illustrates a schematic configuration of an electrochemical sensor 90 as an electrolyte analysis device according to a first embodiment of the present invention.

The electrochemical sensor 90 includes, in general, an electrolyte analysis test strip (hereinafter, simply referred to as "test strip") 30 of one embodiment and a main body 10 to which the test strip 30 is to be mounted. For easy understanding, an XYZ orthogonal coordinate system is appropriately illustrated in some drawings to be described later. The test strip 30 is used to measure a concentration ratio between a first ion species and a second ion species contained in an electrolyte which is a measurement target. In this example, the electrolyte as the measurement target is urine, the first ion species is sodium ions, and the second ion species is potassium ions.

(Configuration of Test Strip)

Figure 2B:
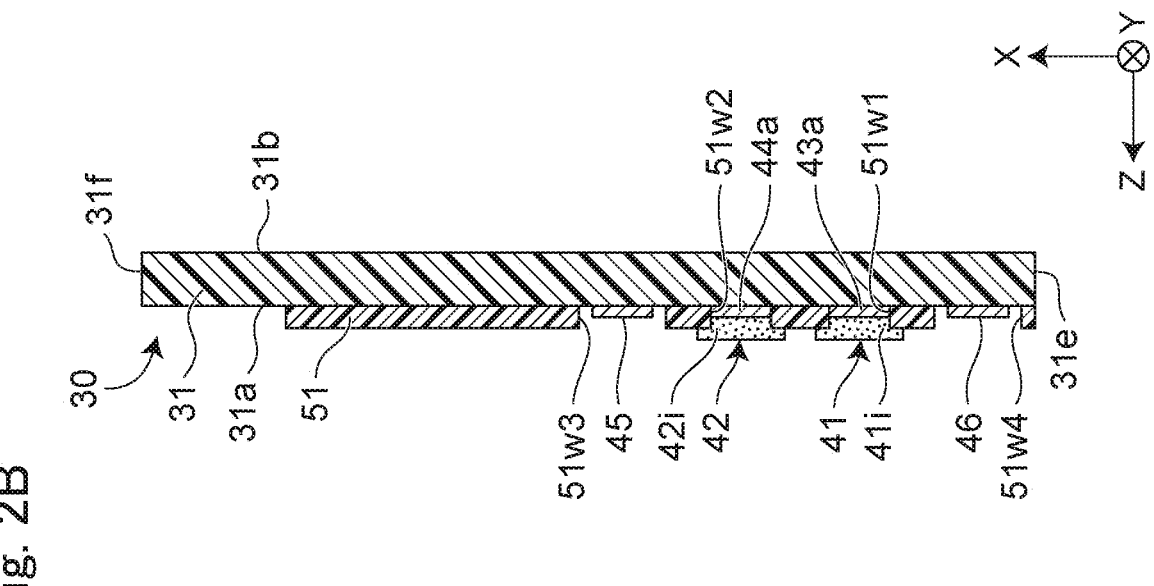
FIG. 2B is a view illustrating a cross section (end surface) taken along line IIB-IIB in FIG. 2A.
Figure 2A:
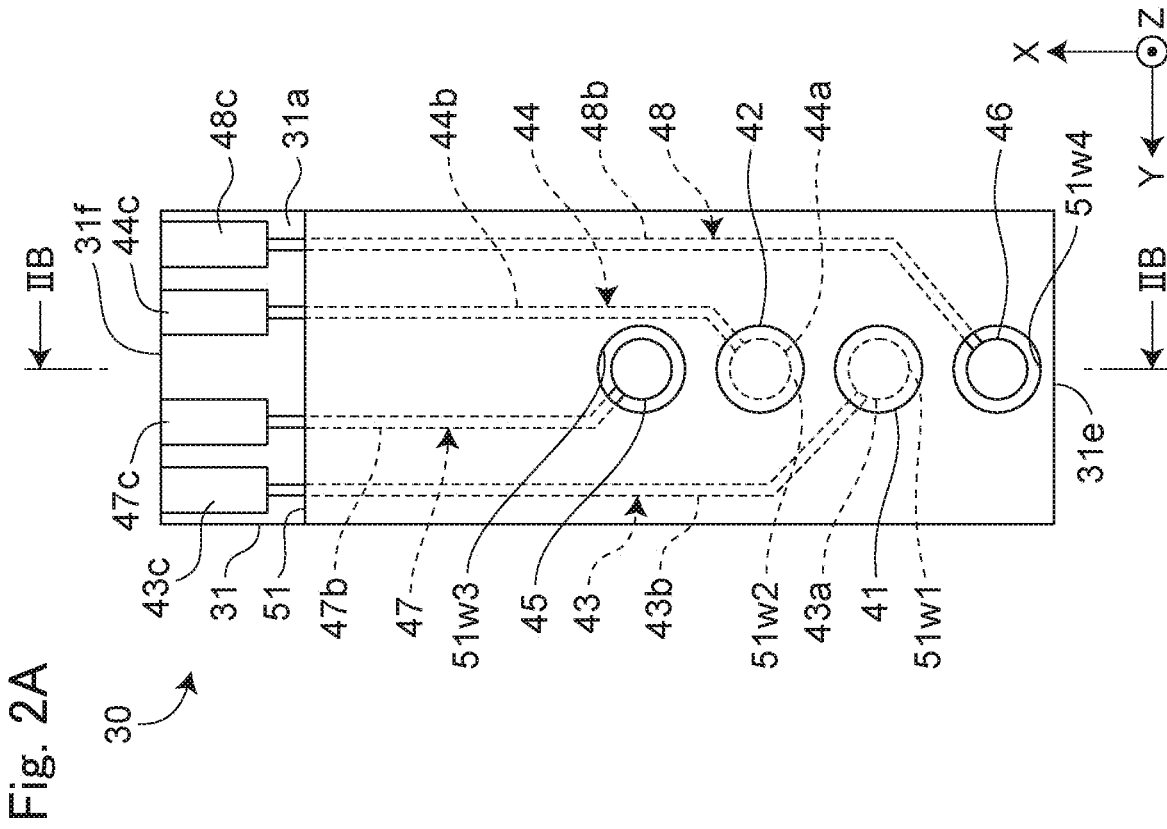
FIG. 2A is a view illustrating a planar layout of an electrolyte analysis test strip included in the electrochemical sensor.

FIG. 2A illustrates a planar layout of the test strip 30. FIG. 2B illustrates a cross section (end surface) taken along line IIB-IIB in FIG. 2A. As can be understood from these drawings, the test strip 30 includes one elongated substrate 31 extending from one end 31e to an other end 31f in X direction as one direction, and includes, on a front surface 31a which is a main surface of the substrate 31, a sodium ion sensitive electrode 41 as a first ion sensitive electrode provided in a circular specific region 51w1 on the side of the one end 31e in the X direction, a potassium ion sensitive electrode 42 as a second ion sensitive electrode provided in another circular specific region 51w2 located closer to the other end 31f than the specific region 51w1, and first and second main extraction electrodes 43 and 44 respectively extending from the sodium ion sensitive electrode 41 and the potassium ion sensitive electrode 42 to the side of the other end 31f.

The "side of the one end 31e" means a side closer to the one end 31e, of the one end 31e and the other end 31f, regarding the X direction. The "side of the other end 31f" means a side closer to the other end 31f, of the one end 31e and the other end 31f, regarding the X direction.

The first main extraction electrode 43 includes a circular base portion 43a provided in the specific region 51w1, an elongated lead portion 43b extending from the base portion 43a to the side of the other end 31f, and an electrode pad 43c provided on the side of the other end 31f, continuing from the lead portion 43b, and wider than the lead portion 43b. The second main extraction electrode 44 includes a circular base portion 44a provided in the specific region 51w2, an elongated lead portion 44b extending from the base portion 44a to the side of the other end 31f, and an electrode pad 44c provided on the side of the other end 31f, continuing from the lead portion 44b, and wider than the lead portion 44b.

As can be understood from FIG. 2B, the sodium ion sensitive electrode 41 includes the base portion 43a of the first main extraction electrode 43 and a sodium ion sensitive film 41i as a first ion sensitive film provided on and in electrical contact with the base portion 43a. The potassium ion sensitive electrode 42 includes the base portion 44a of the second main extraction electrode 44 and a potassium ion sensitive film 42i as a second ion sensitive film provided on and in electrical contact with the base portion 44a. The sodium ion sensitive electrode 41 and the potassium ion sensitive electrode 42 come into contact with the electrolyte (in this example, urine) as the measurement target to respectively produce a first potential (referred to as $E_1$) corresponding to the concentration of sodium ions and a second potential (referred to as $E_2$) corresponding to the concentration of potassium ions.

Furthermore, as illustrated in FIG. 2A, the test strip 30 includes, on the front surface 31a of the substrate 31, a proximal portion electrode 45 and a distal portion electrode 46 which form a solution detection electrode for detecting whether or not the test strip 30 is brought into contact with the electrolyte. The proximal portion electrode 45 is provided in a circular proximal region 51w3 located between the specific region 51w2 and the other end 31f in the X direction in a manner separated from the first and second main extraction electrodes 43 and 44. The distal portion electrode 46 is provided in a circular distal region 51w4 located between the specific region 51w1 and the one end 31e in the X direction. In this example, the proximal portion electrode 45 and the distal portion electrode 46 have circular shapes substantially corresponding to the proximal region 51w3 and the distal region 51w4, respectively. Furthermore, a first auxiliary extraction electrode 47 extending from the proximal portion electrode 45 to the side of the other end 31f and a second auxiliary extraction electrode 48 extending from the distal portion electrode 46 to the side of the other end 31f are provided on the front surface 31a of the substrate 31.

The first auxiliary extraction electrode 47 includes an elongated lead portion 47b extending from the proximal portion electrode 45 to the side of the other end 31f, and an electrode pad 47c provided on the side of the other end 31f, continuing from the lead portion 47b, and wider than the lead portion 47b. The second auxiliary extraction electrode 48 includes a lead portion 48b extending from the distal portion electrode 46 to the side of the other end 31f, and an electrode pad 48c provided on the side of the other end 31f, continuing from the lead portion 48b, and wider than the lead portion 48b.

In this example, on the front surface 31a of the substrate 31, the lead portions 43b, 47b, 44b, and 48b are arrayed from the +Y side to the −Y side in this order in a manner separated from each other. Correspondingly, along the other end 31f of the substrate 31, the electrode pads 43c, 47c, 44c, and 48c are arrayed in this order in a manner separated from each other.

An insulating film 51 as a protective layer is provided on the front surface 31a of the substrate 31. The insulating film 51 covers from the one end 31e to a portion substantially reaching the electrode pads 43c, 47c, 44c, and 48c in the X direction. Thus, each of the lead portions 43b, 47b, 44b, and 48b is protected by the insulating film 51. The electrode pads 43c, 47c, 44c, and 48c are exposed out of the insulating film 51, and are to be electrically connected to a connector of the main body described later.

On the front surface 31a of the substrate 31, the insulating film 51 has, in this example, four circular openings penetrating in a thickness direction (Z direction) to define the specific regions 51w1 and 51w2, the proximal region 51w3, and the distal region 51w4 described above (the openings are respectively denoted by the same references 51w1, 51w2, 51w3, and 51w4 of the regions defined by the openings themselves). Effective regions (functional regions) of the sodium ion sensitive electrode 41 and the potassium ion sensitive electrode 42 are defined by the sizes of the openings 51w1 and 51w2, respectively (in this example, about 4 mm in diameter for each). In this example, the sizes of the openings 51w3 and 51w4 are each set to a diameter of about 5 mm.

The substrate 31 is made of an insulating material such as polyethylene terephthalate (PET), glass, silicon, a polyimide film, glass epoxy, polycarbonate, or acrylic. Thus, the front surface 31a (and a rear surface 31b) also has an insulating property. In this example, the size of the substrate 31 is set to about 60 to 100 mm in the X direction (longitudinal direction), about 15 to 30 mm in the Y direction (width direction), and about 200 μm in the Z direction (thickness direction).

The first main extraction electrode 43, the second main extraction electrode 44, the first auxiliary extraction electrode 47, and the second auxiliary extraction electrode 48 are all made of a conductive material such as Pt, Ag, Au, Ir, C, or IrO$_2$. Each of the first main extraction electrode 43, the second main extraction electrode 44, the first auxiliary extraction electrode 47, and the second auxiliary extraction electrode 48 has a thickness of about 10 μm.

The insulating film 51 is made of a photocurable or thermosetting insulating resist, or a seal, a sheet, a tape, or the like having an insulating property. The thickness of the insulating film 51 is about 30 μm to 100 μm.

In this example, a solution obtained by dissolving Bis (12-corwn-4), polyvinyl chloride (PVC), 2-nitrophenyloctyl ether (NPOE), and potassium tetrakis (4-chlorophenyl) borate (K-TCPB) in tetrahydrofuran (THF) is used as a material liquid for forming a sodium ion sensitive film 41i. In this example, a solution obtained by dissolving Bis (benzo-15-crown-5), PVC, NPOE, and K-TCPB in THF is used as a material liquid for forming the potassium ion sensitive film 42i. These material liquids are dried and cured at a manufacturing stage.

The manufacturing process of the test strip 30 is as follows, for example. First, the first main extraction electrode 43, the second main extraction electrode 44, the proximal portion electrode 45, the first auxiliary extraction electrode 47 continuing from the proximal portion electrode 45, the distal portion electrode 46, and the second auxiliary extraction electrode 48 continuing from the distal portion electrode 46 are simultaneously formed on the front surface 31a of the substrate 31 by, for example, a screen printing method. Next, on the front surface 31a having these electrodes, the insulating film 51 is formed by, for example, a screen printing method. Here, the insulating film 51 is formed in a state to make the electrode pads 43c, 47c, 44c, and 48c are left exposed, and to have the four openings 51w1, 51w2, 51w3, and 51w4 respectively through which the base portion 43a of the first main extraction electrode 43, the base portion 44a of the second main extraction electrode 44, the proximal portion electrode 45, and the distal portion electrode 46 are exposed. Next, a material liquid for forming the sodium ion sensitive film 41i as the first ion sensitive film is applied to the opening 51w1 on the front surface 31a of the substrate 31 by, for example, an inkjet printing method. Then, the applied material liquid is dried and cured to form the sodium ion sensitive film 41i in a region corresponding to the opening 51w1. The base portion 43a and the sodium ion sensitive film 41i constitute the sodium ion sensitive electrode 41. Next, a material liquid for forming the potassium ion sensitive film 42i is applied to the opening 51w2 on the front surface 31a of the substrate 31 by, for example, an inkjet printing method. Then, the applied material liquid is dried and cured to form the potassium ion sensitive film 42i in a region corresponding to the opening 51w2. The base portion 44a and the potassium ion sensitive film 42i constitute the potassium ion sensitive electrode 42.
(Configuration of Main Body)

FIG. 1B schematically illustrates the main body 10 of the electrochemical sensor 90 as viewed obliquely. The main body 10 has, in this example, an elongated prismatic shape to be gripped by a hand of a user. The electrochemical sensor 90 is configured as a hand-held type device which is used by a user with holding the main body 10 in his/her hand.

The main body 10 includes a housing 10s forming a substantially prismatic outer peripheral wall, a display unit 20 as a display screen provided substantially at the center of a front face (surface on the +Z side) 10f of the housing 10s, an operation unit 13 provided at a place further on the +X side than the display unit 20 on the front face 10f, and a connector 21 provided on an end surface 10t on the −X side of the housing 10s. In this example, the display unit 20 includes a liquid crystal display (LCD), and displays various kinds of information such as a calculation result given by a control unit 11 (see FIG. 3) to be described later. In this example, the operation unit 13 includes three push-button switches, that is, a power switch 13a for turning on and off a power of the electrochemical sensor 90, a calibration switch 13b for inputting an instruction to start a calibration with an electrolyte (standard solution) having a known concentration ratio between sodium ions and potassium ions, and a measurement switch 13c for inputting an instruction to start a calculation of a concentration ratio between sodium ions and potassium ions in urine as a measurement target solution.

The connector 21 has a slot 22 that opens toward the −X side to detachably receive the test strip 30. In the slot 22, contact electrodes 21a, 21b, 21c, and 21d made of leaf springs bent in an L shape are provided at places respectively corresponding to the electrode pads 43c, 47c, 44c, and 48c of the test strip 30. As illustrated in FIG. 1A, when the user inserts the other end 31f of the test strip 30 in the slot 22 in the direction indicated by arrow X1, the electrode pads 43c, 47c, 44c, and 48c come into contact with and are electrically connected to the contact electrodes 21a, 21b, 21c, and 21d, respectively. As a result, the first potential E$_1$ produced by the sodium ion sensitive electrode 41 of the test strip 30 and the second potential E$_2$ produced by the potassium ion sensitive electrode 42 of the test strip 30 are transmitted to the contact electrodes 21a and 21c via the first and second main extraction electrodes 43 and 44, respectively, and can be input to the main body 10. The proximal portion electrode 45 and the distal portion electrode 46 constituting the solution detection electrode are electrically connected to the contact electrodes 21b and 21d via the first and second auxiliary extraction electrodes 47 and 48, respectively. Thus, the impedance between the proximal portion electrode 45 and the distal portion electrode 46 can be detected from the main body 10 side via the contact electrodes 21b and 21d.

Figure 3:
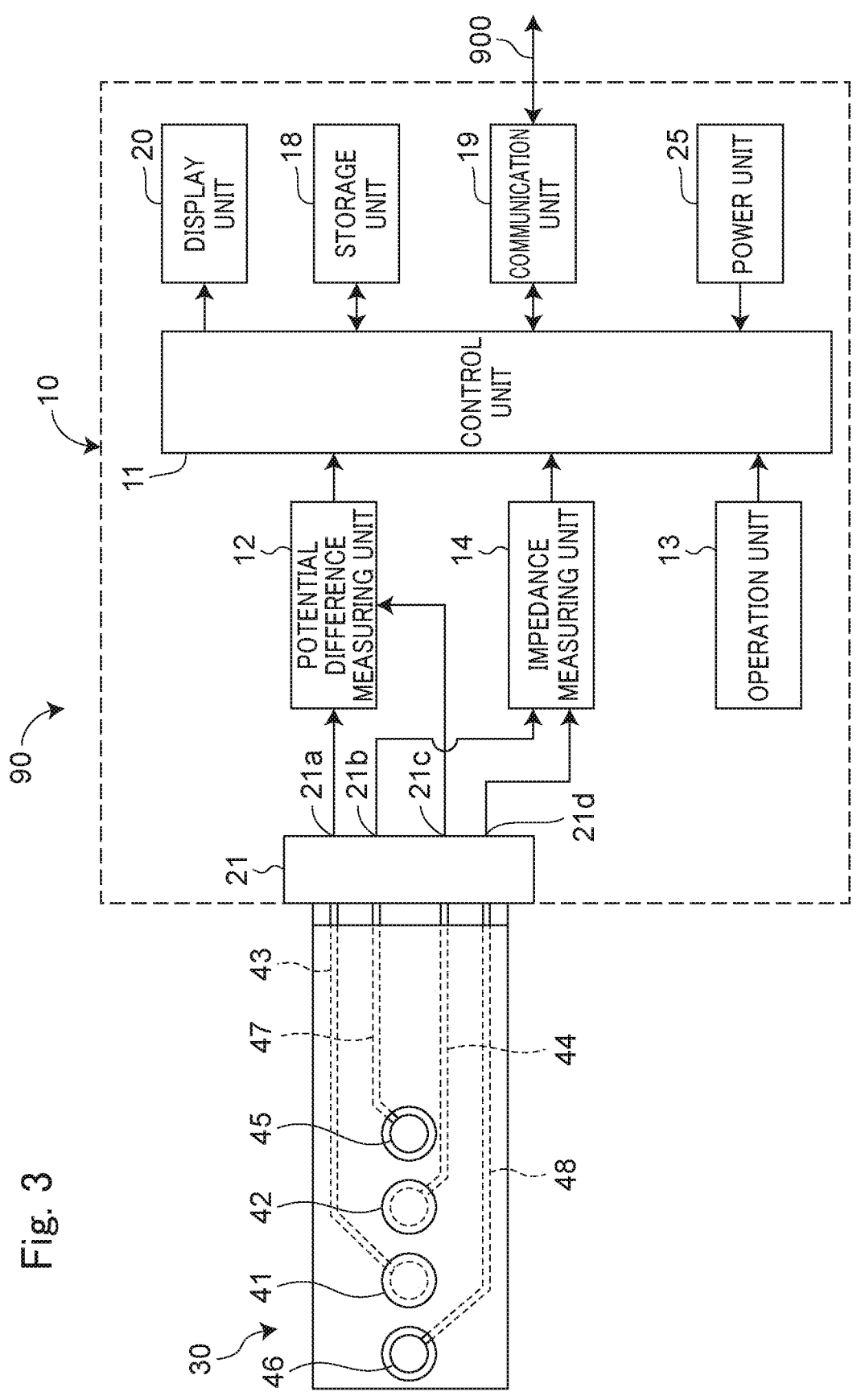
FIG. 3 is a diagram illustrating a block configuration of the electrochemical sensor.

As illustrated in FIG. 3, in addition to the display unit 20, the operation unit 13, and the connector 21 described above, the control unit 11, a potential difference measuring unit 12, an impedance measuring unit 14, a storage unit 18, a communication unit 19, and a power unit 25 are mounted and housed in the main body 10. The control unit 11 includes a micro controller unit (MCU) including a central processing unit (CPU) operated by software, and controls the entire operation of the electrochemical sensor 90 as described later. The potential difference measuring unit 12 receives a potential difference ΔE between the sodium ion sensitive electrode 41 and the potassium ion sensitive electrode 42 of the test strip 30 via the contact electrodes 21a and 21c, amplifies the potential difference ΔE, and inputs the amplified potential difference ΔE to the control unit 11. The impedance measuring unit 14 measures the impedance between the proximal portion electrode 45 and the distal portion electrode 46 via the contact electrodes 21b and 21d, and inputs the impedance to the control unit 11. The storage unit 18 includes a semiconductor memory, and stores data for a program for controlling the electrochemical sensor 90, setting data for setting various functions of the electrochemical sensor 90, data of measurement value, and the like. The storage unit 18 is used as a work memory or the like when a program is executed. The communication unit 19 transmits information (in this example, measured value data) from the control unit 11 to another device (for example, a server) via a network 900. Information from another device is received via the network 900 and transferred to the control unit 11. The power unit 25 supplies an electrical power to the control unit 11, the display unit 20, the potential difference measuring unit 12, the impedance measuring unit 14, the storage unit 18, the communication unit 19, and other units in the main body 10.

Figure 8:
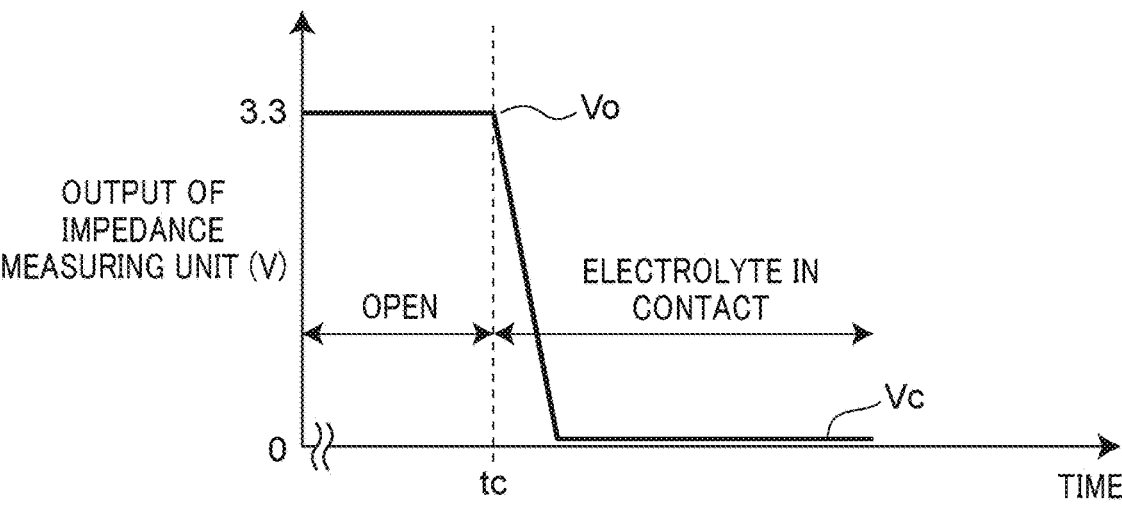
FIG. 8 is a chart illustrating a change in output monitored in the main body in response to a change in a direct-current resistance value of a solution detection electrode when the electrolyte has come into contact with the solution detection electrode included in the electrolyte analysis test strip.

In particular, the control unit 11 serves as a solution detection processing unit to determine whether or not the electrolyte is in contact so as to integrally cover from the distal portion electrode 46 to the proximal portion electrode 45. As illustrated in FIG. 8, when the electrolyte is not in contact and therefore the distal portion electrode 46 and the proximal portion electrode 45 are open between them, the output of the impedance measuring unit 14 is at a level of voltage Vo (≈3.2 V) close to a substantial power voltage (in this example, 3.3 V) corresponding to a direct-current resistance value between the distal portion electrode 46 and the proximal portion electrode 45 (substantially ∞). When the electrolyte is in contact so as to integrally cover from the proximal portion electrode 45 to the distal portion electrode 46, the output of the impedance measuring unit 14 is at a level of voltage Vc (≈0.1 V) substantially close to 0 corresponding to the direct-current resistance value between the distal portion electrode 46 and the proximal portion electrode 45 (in this example, the electrolyte was brought into contact at time tc). Thus, the control unit 11 can determine whether or not the electrolyte is in contact so as to integrally cover from the distal portion electrode 46 to the proximal portion electrode 45 according to the output level of the impedance measuring unit 14. When the electrolyte is in contact so as to integrally cover from the proximal portion electrode 45 to the distal portion electrode 46, it can be said that the electrolyte is in contact so as to integrally cover the sodium ion sensitive electrode 41 and the potassium ion sensitive electrode 42 disposed between the distal portion electrode 46 and the proximal portion electrode 45. Thus, the control unit 11 can determine whether or not the electrolyte is in contact so as to integrally cover the sodium ion sensitive electrode 41 and the potassium ion sensitive electrode 42 according to the output level of the impedance measuring unit 14.

The control unit 11 serves as a calculation unit to calculate a concentration ratio $(C_1/C_2)$ between a concentration $C_1$ of sodium ions and a concentration $C_2$ of potassium ions contained in the electrolyte (in this example, urine), which is the measurement target, using the potential difference ΔE between the first potential $E_1$ and the second potential $E_2$ that have been input to the main body 10.

In the electrochemical sensor 90, the concentration ratio $(C_1/C_2)$ between the concentration $C_1$ of sodium ions and the concentration $C_2$ of potassium ions contained in the measurement target solution is obtained as described below. It is here assumed that sensitivity $S_1$ and selectivity $k_1$ of the sodium ion sensitive electrode 41 are respectively almost equal to sensitivity $S_2$ and selectivity $k_2$ of the potassium ion sensitive electrode 42. That is, $S_1-S_2 \approx 0$ and $k_1-k_2 \approx 0$. In this case, as disclosed in Patent Document 1 (JP 6127460 B2), the potential difference ΔE between the sodium ion sensitive electrode 41 and the potassium ion sensitive electrode 42 is simply expressed by the following equation (Eq. 1).

$$\Delta E = E_1^0 - E_2^0 + S_1 \log(C_1/C_2) \qquad \text{(Eq. 1)}$$

Here, $E_1{}^0-E_2{}^0$ is a constant and is assumed to be obtained in advance. When the sensitivity $S_1$ as a parameter is obtained by measuring a ΔE for an electrolyte (standard solution) having a known concentration ratio between sodium ions and potassium ions, and further a potential difference ΔE is measured for an electrolyte as a measurement target, then a concentration ratio Ms $(=C_1/C_2)$ between sodium ions and potassium ions in the electrolyte as the measurement target can be calculated based on the equation (Eq. 1).

(Electrolyte Analysis Method)

FIG. 4 illustrates a flow of an electrolyte analysis method in which a subject as a user measures a concentration ratio between sodium ions and potassium ions in urine as an electrolyte using the electrochemical sensor 90. Next, a measurement procedure to be performed by the user will be described with reference to FIGS. 5A to 5D and FIGS. 6A to 6E in addition to FIG. 4.

Figure 5A:
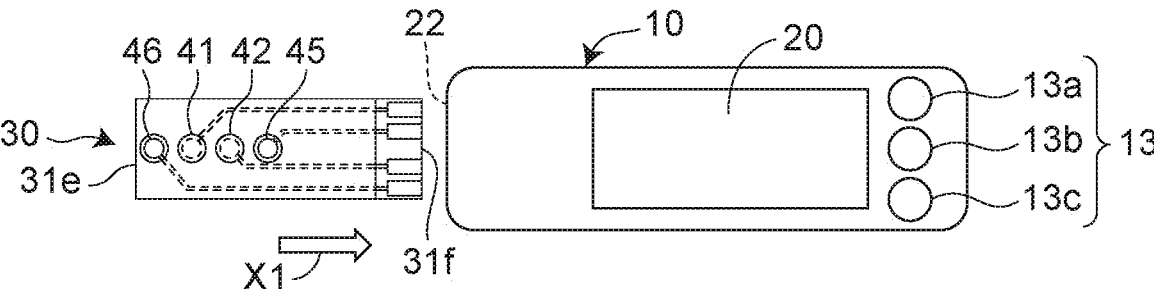
FIGS. 5A to 5D are figures schematically illustrating a (first half) procedure of the electrolyte analysis method.

First, as illustrated in FIG. 5A, the user inserts the other end 31f of the test strip 30 in the slot 22 of the main body 10 as indicated by arrow X1 to mount the test strip 30 on the main body 10 (step S101 in FIG. 4). This is called "mounting operation". By this mounting operation, the electrode pads 43c, 47c, 44c, and 48c of the test strip 30 come into contact with and are electrically connected to the contact electrodes 21a, 21b, 21c, and 21d of the connector 21, respectively.

Figure 5B:
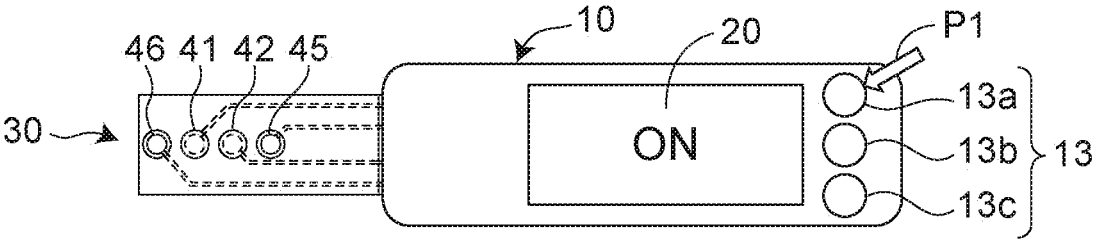

Next, in this state (mounted state), as indicated by an arrow P1 in FIG. 5B, the user presses the power switch 13a to turn on (step S102 in FIG. 4). Then, as illustrated in FIG. 5B, the control unit 11 causes the display unit 20 to display a character string "ON" indicating that the power is turned on.

Figure 5C:
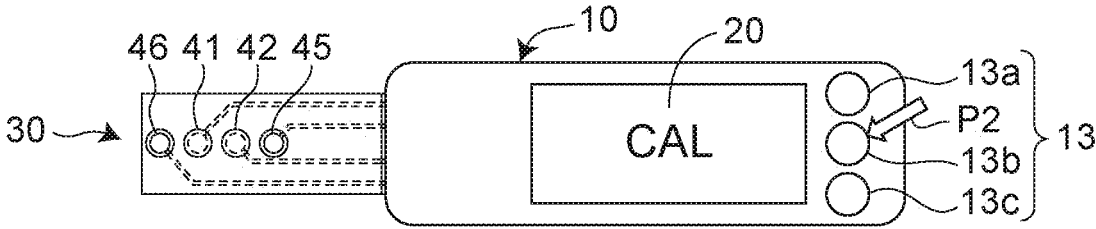

Next, as indicated by an arrow P2 in FIG. 5C, the user presses the calibration switch 13b to turn on (step S103 in FIG. 4). Then, as illustrated in FIG. 5C, the control unit 11 causes the display unit 20 to display a character string "CAL" indicating awaiting for a calibration processing.

Figure 5D:
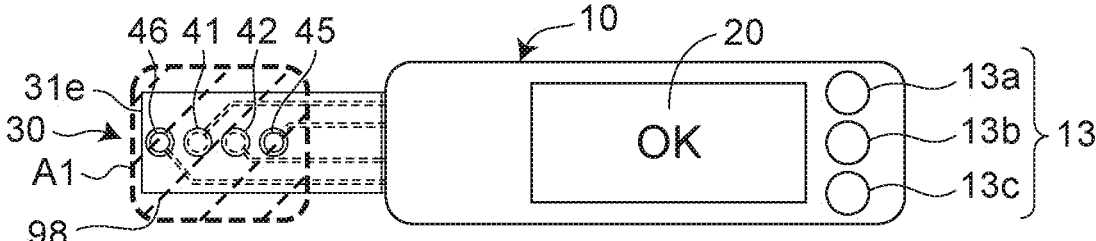

Triggered by the calibration switch 13b being turned on, the control unit 11 serves as a solution detection processing unit to start monitoring the output level of the impedance measuring unit 14 described above (step S104 in FIG. 4), and determines whether or not the electrolyte (in this embodiment, the standard solution) is in contact with the test strip 30 to integrally cover from the proximal portion electrode 45 to the distal portion electrode 46 according to the output level of the impedance measuring unit 14 (step S105). It is assumed that the standard solution has a known concentration ratio Mr between the concentration of sodium ions and the concentration of potassium ions. When the contact of the electrolyte is not detected (NO in step S105), the control unit 11 returns to step S104 and waits until a predetermined time (in this example, three minutes) elapses while monitoring the output level of the impedance measuring unit 14 (NO in step S106). In this example, while the output level of the impedance measuring unit 14 is monitored, as illustrated in FIG. 5D, the user brings a standard solution 98 as an electrolyte into contact with the test strip 30 so as to integrally cover a region A1 (indicated by hatching with broken lines) extending from the one end 31e across the distal region 51w4 and the specific regions 51w1 and 51w2 to the proximal region 51w3 (this is referred to as "electrolyte contact operation"). Then, the control unit 11 serves as a solution detection processing unit to determine that the electrolyte is in contact so as to integrally cover from the distal portion electrode 46 to the proximal portion electrode 45 (thus, the electrolyte is in contact with the sodium ion sensitive electrode 41 and the potassium ion sensitive electrode 42 so as to integrally cover the sodium ion sensitive electrode 41 and the potassium ion sensitive electrode 42) according to the output level of the impedance measuring unit 14. When such a contact of the electrolyte is detected (YES in step S105 in FIG. 4), the control unit 11 proceeds, triggered by a detection of the contact of the electrolyte, to step S108 described later to start the calibration processing. Note that, when a predetermined time (in this example, three minutes) elapses with no detection of the contact of the electrolyte (YES in step S106), the control unit 11 determines that an error has occurred (step S107), and turns off the power of the electrochemical sensor 90 (step S119). The electrolyte contact operation itself may be performed before the calibration switch 13b is turned on.

The electrolyte contact operation in which the standard solution 98 is brought into contact with the test strip 30 so as to integrally cover the region A1 can be performed by sprinkling the standard solution 98 on the test strip 30 so as to integrally cover the region A1. It can also be performed in the following way. For example, as illustrated in FIG. 7A, a sponge 81 impregnated with the standard solution 98 in advance is prepared in a predetermined container 80. As indicated by an arrow X2, the user inserts the side of the one end 31e of the test strip 30 into the sponge 81. As illustrated in FIG. 7B, the standard solution 98 is thereby brought into contact with the test strip 30 so as to integrally cover the region A1.

When the standard solution 98 is brought into contact with the sodium ion sensitive electrode 41 and the potassium ion sensitive electrode 42 in step S105 in FIG. 4 (YES in step S105), the sodium ion sensitive electrode 41 and the potassium ion sensitive electrode 42 respectively produce a first potential (referred to as $E_{1r}$) corresponding to the concentration of sodium ions and a second potential (referred to as $E_{2r}$) corresponding to the concentration of potassium ions.

In step S108, the control unit 11 serves as a calibration processing unit to monitor the potential difference $\Delta E$ ($=E_{1r}-E_{2r}$) between the sodium ion sensitive electrode 41 and the potassium ion sensitive electrode 42 of the test strip 30 via the potential difference measuring unit 12. As illustrated in "CALIBRATING" period in FIG. 9, the potential difference $\Delta E$ converges to a value (in this example, Er) corresponding to the concentration ratio between sodium ions and potassium ions included in the standard solution 98 (for example, fluctuation becomes 2 mV or less in 5 seconds). In this example, the potential difference $\Delta E$ converges to Er at time t1 indicated in FIG. 9. When the potential difference $\Delta E$ converges to Er (YES in step S109 in FIG. 4), the control unit 11 determines the potential difference $\Delta E$ for the standard solution 98 to be Er, and obtains the sensitivity $S_1$ based on the above-described equation (Eq. 1) using the potential difference Er and the concentration ratio Mr (a calibration completed). Then, the user is notified that the calibration is completed. In this example, as illustrated in FIG. 5D, the control unit 11 causes the display unit 20 to display a character string "OK" indicating that the calibration is completed (step S110 in FIG. 4).

Figure 6A:
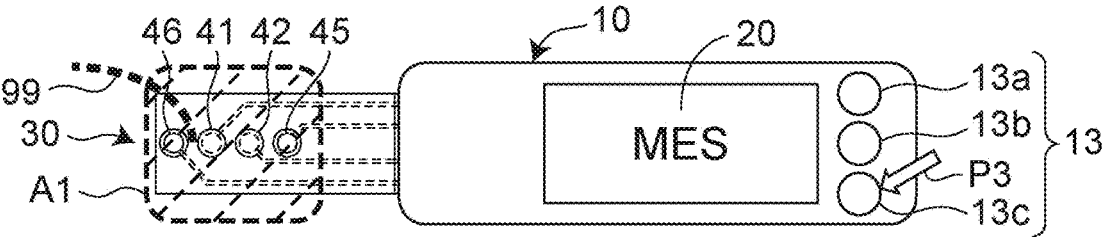
FIGS. 6A to 6E are figures schematically illustrating a (second half) procedure of the electrolyte analysis method.

Next, as illustrated in FIG. 6A, the control unit 11 displays a character string "MES" indicating that a urine measurement is awaited on the display unit 20 (step S111 in FIG. 4). The user who sees the display performs an operation of replacing the electrolyte that is in contact so as to integrally cover the region A1 from the standard solution 98 to urine 99 as a measurement target solution. The operation of replacing the electrolyte in contact with the region A1 from the standard solution 98 to the urine 99 can be performed by sprinkling the urine 99 on the test strip 30 so as to integrally cover the region A1. In addition, as illustrated in FIG. 7C, the electrolyte impregnated in the sponge 81 may be replaced from the standard solution 98 to the urine 99 by pouring the urine 99 into the container 80 containing the standard solution 98 so as to overflow (after the measurement being completed, the container 80 is typically disposed).

By this operation, the sodium ion sensitive electrode 41 and the potassium ion sensitive electrode 42 come into contact with the urine 99 to respectively produce the first potential $E_1$ corresponding to the concentration of sodium ions and the second potential $E_2$ corresponding to the concentration of potassium ions.

Figure 6B:
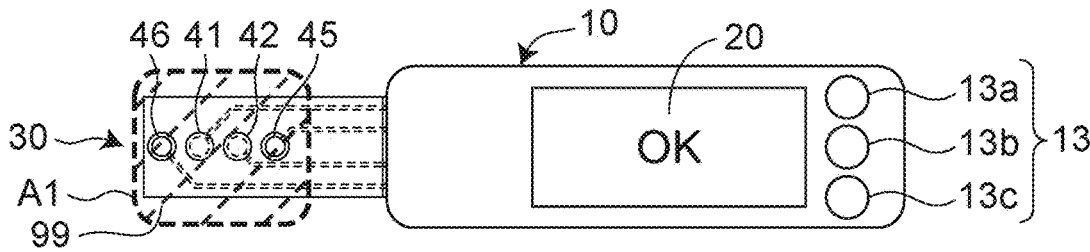

Next, as indicated by an arrow P3 in FIG. 6A, the user presses the measurement switch 13c to give an instruction to start measuring a concentration ratio Ms ($=C_1/C_2$) between sodium ions and potassium ions in the urine 99 (step S112 in FIG. 4). Then, the control unit 11 starts a urine measurement processing. That is, the control unit 11 serves as a calculation unit to monitor the potential difference $\Delta E$ ($=E_1-E_2$) between the sodium ion sensitive electrode 41 and the potassium ion sensitive electrode 42 of the test strip 30 via the potential difference measuring unit 12 (step S113). As illustrated in "AWAITING URINE MEASUREMENT" period in FIG. 9, the potential difference $\Delta E$ temporarily fluctuates as the electrolyte is replaced. However, as illustrated in "MEASURING URINE" period in FIG. 9, after such a temporal fluctuation, the potential difference $\Delta E$ converges again to a value (in this example, Es) corresponding to the concentration ratio between sodium ions and potassium ions included in the urine 99 (for example, the fluctuation becomes 2 mV or less in 5 seconds). In this example, the potential difference $\Delta E$ converges to Es at time t3 indicated in FIG. 9. When the potential difference $\Delta E$ converges to Es (YES in step S114 in FIG. 4), the control unit 11 determines the potential difference $\Delta E$ for the urine 99 to be Es (step S115 in FIG. 4). At the same time, as illustrated in FIG. 6B, the control unit 11 causes the display unit 20 to display a character string "OK" indicating that the potential difference $\Delta E$ is determined.

Subsequently, the control unit 11 serves as a calculation unit to calculate the concentration ratio Ms ($=C_1/C_2$) (that is, Na/K ratio) for urine 99 based on the above-described equation (Eq. 1) using the sensitivity $S_1$ obtained in step S110 in FIG. 4 and the potential difference Es (step S116 in FIG. 4).

Figure 6C:
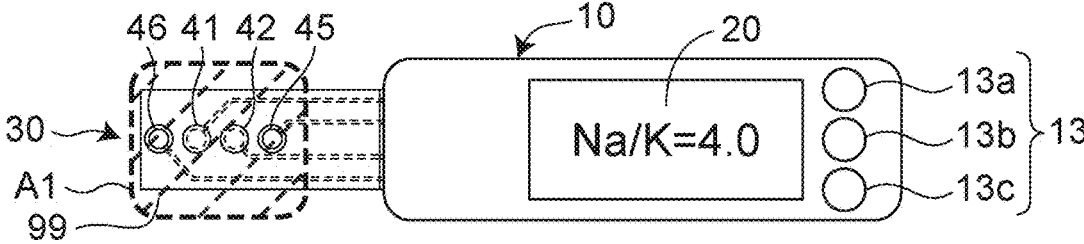
Figure 6D:
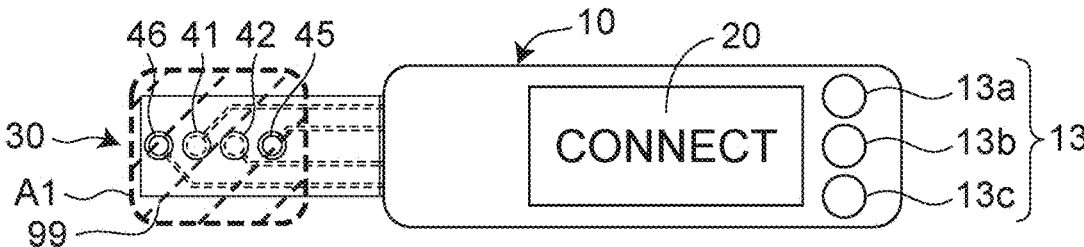

Subsequently, the control unit 11 causes the display unit 20 to display the measurement result (in this example, Na/K ratio) (step S117 in FIG. 4). For example, the Na/K ratio as a measurement result is 4.0. In this case, as illustrated in FIG. 6C, the display unit 20 is caused to display a character string "Na/K=4.0" indicating the measurement result. At the same time, in this example, the control unit 11 operates the communication unit 19 to transmit information indicating the measured value data (that is, Na/K ratio) to another device (in this example, a server) via the network 900. In this case, as illustrated in FIG. 6D, the control unit 11 causes the display unit 20 to display a character string "CONNECT" indicating that the measured value data is being transmitted.

Figure 6E:
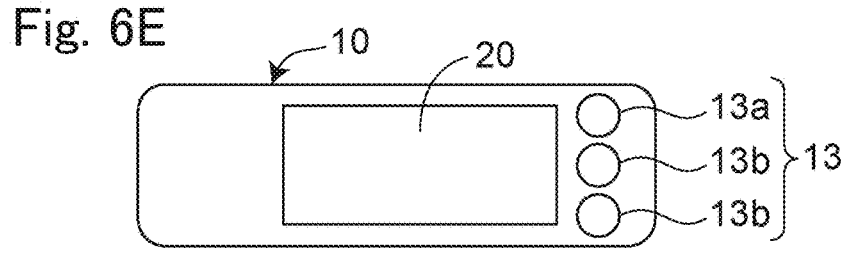

Thereafter, the control unit 11 waits for a certain instruction to be input by the user via the operation unit 13 (step S118 in FIG. 4). When a predetermined time (in this example, three minutes) elapses without any instruction being input (YES in step S118), the electrochemical sensor 90 is powered off (step S119). As illustrated in FIG. 6E, the display unit 20 is thereby turned off.

As described above, in the flow of the electrolyte analysis method, in step S105 in FIG. 4, it is determined whether or not the electrolyte has come into contact with the test strip 30 so as to integrally cover the region from the distal portion electrode 46 to the proximal portion electrode 45 according to the output level of the impedance measuring unit 14. Thus, it can be confirmed that the electrolyte is in contact so as to integrally cover the sodium ion sensitive electrode 41 and the potassium ion sensitive electrode 42. By performing the measurement in a state confirmed that the electrolyte is in contact so as to integrally cover the sodium ion sensitive electrode 41 and the potassium ion sensitive electrode 42, reliability of measurement result (in this example, Na/K ratio) can be enhanced.

(First Exemplary Modification of Test Strip)

In the above example, the test strip 30 includes the proximal portion electrode 45 provided in the proximal region 51w3 and the distal portion electrode 46 provided in the distal region 51w4 as solution detection electrodes. However, the present invention is not limited to this configuration. It may be configured that the distal portion electrode 46 (and the second auxiliary extraction electrode 48) is omitted, and solution detection is performed using, for example, the sodium ion sensitive electrode 41 (and the first main extraction electrode 43) instead of using the distal portion electrode 46 (and the second auxiliary extraction electrode 48). That is, according to whether the impedance between the sodium ion sensitive electrode 41 and the proximal portion electrode 45 has decreased, whether or not the electrolyte has come into contact so as to integrally cover a region from the sodium ion sensitive electrode 41 to the proximal portion electrode 45 is determined. In this configuration, whether or not the electrolyte is in contact so as to integrally cover the sodium ion sensitive electrode 41 and the potassium ion sensitive electrode 42 can be determined.

In this case, the number of solution detection electrodes can be reduced. This allows reducing X direction dimensions and Y direction dimensions of the test strip 30 (substrate 31).

(Second Exemplary Modification of Test Strip)

In the test strip 30 in the example, the number of the proximal portion electrode 45 constituting the solution detection electrode is one, but the present invention is not limited to this configuration. For example, as illustrated in FIG. 10A, the number of the proximal portion electrodes 45 may be two. In the following drawings, the same component as that in the above example is denoted by the same reference, and redundant description is omitted.

A test strip 30A illustrated in FIG. 10A has a first proximal portion electrode 45-1 and a second proximal portion electrode 45-2 as the proximal portion electrode 45 on the front surface 31a of the substrate 31. The first proximal portion electrode 45-1 is provided in a circular proximal region 51w3-1 located between a potassium ion sensitive electrode 42 and the other end 31f in the X direction in a manner separated from first and second main extraction electrodes 43 and 44. The second proximal portion electrode 45-2 is provided in a circular proximal region 51w3-2 located between the proximal region 51w3-1 and the other end 31f in the X direction in a manner separated from the first and second main extraction electrodes 43 and 44. In this example, the first proximal portion electrode 45-1 and the second proximal portion electrode 45-2 are separated from each other in the X direction.

Furthermore, auxiliary extraction electrodes 47-1 and 47-2 extend to the side of the other end 31f respectively from the first proximal portion electrode 45-1 and the second proximal portion electrode 45-2 in a manner separated from each other. The auxiliary extraction electrode 47-1 includes an elongated lead portion 47b-1 extending from the first proximal portion electrode 45-1 to the side of the other end 31f, and an electrode pad 47c-1 provided on the side of the other end 31f, continuing from the lead portion 47b-1, and wider than the lead portion 47b-1. The auxiliary extraction electrode 47-2 includes an elongated lead portion 47b-2 extending from the second proximal portion electrode 45-2 to the side of the other end 31f, and an electrode pad 47c-2 provided on the side of the other end 31f, continuing from the lead portion 47b-2, and wider than the lead portion 47b-2.

In this example, on the front surface 31a of the substrate 31, the lead portions 43b, 47b-1, 47b-2, 44b, and 48b are arrayed from the +Y side to the −Y side in this order in a manner separated from each other. Correspondingly, along the other end 31f of the substrate 31, the electrode pads 43c, 47c-1, 47c-2, 44c, and 48c are arrayed in this order in a manner separated from each other.

In a case of using the test strip 30A, a connector 21 of a main body 10 includes contact electrodes (not illustrated) that are brought into contact with the electrode pads 47c-1 and 47c-2, respectively, instead of the contact electrode 20b described above. In addition, an impedance measuring unit 14 of the main body 10 can detect an impedance between the first proximal portion electrode 45-1 and the distal portion electrode 46 as well as an impedance between the second proximal portion electrode 45-2 and the distal portion electrode 46 via the contact electrodes (not illustrated) of the connector 21.

In the test strip 30A, the first proximal portion electrode 45-1 and the second proximal portion electrode 45-2 are separated from each other in the X direction. Thus, when the range in the X direction to be brought into contact with the electrolyte from the one end 31e in the X direction is previously set different for two types of electrolytes (referred to as "first electrolyte" and "second electrolyte"; for example, the first electrolyte may be a standard solution 98 whose concentration ratio is known and the second electrolyte may be urine 99 as a measurement target), the first and second proximal portion electrodes 45-1 and 45-2 can distinguishingly detect the two types of electrolytes.

Specifically, for example as illustrated in FIG. 10B, the range in the X direction to be brought into contact with the first electrolyte by the electrolyte contact operation is adjusted to a range B1 integrally covering from the one end 31e to the first proximal portion electrode 45-1 but not reaching the second proximal portion electrode 45-2. This can be easily realized by, for example, setting a dimension of the sponge 81 illustrated in FIG. 7A to correspond to the range B1. The range in the X direction to be immersed in the second electrolyte by the electrolyte contact operation is previously adjusted to a range B2 integrally covering from the one end 31$e$ and further beyond the first proximal portion electrode 45-1 to the second proximal portion electrode 45-2. This can be easily realized by setting a dimension of the container 80 (lateral dimension in FIG. 7C) to correspond to the range B2.

With the test strip 30A mounted in the main body 10 in the mounted state, when the impedance measuring unit 14 of the main body 10 detects that an electrolyte is in contact with the first proximal portion electrode 45-1 but is not in contact with the second proximal portion electrode 45-2, it can be recognized that the electrolyte that is currently in contact so as to cover from the one end 31$e$ to the first proximal portion electrode 45-1 is the first electrolyte (for example, the standard solution 98). When the impedance measuring unit 14 of the main body 10 detects via the auxiliary extraction electrodes that an electrolyte is in contact with the first proximal portion electrode 45-1 as well as with the second proximal portion electrode 45-2, it can be recognized that the electrolyte that is currently in contact so as to cover from the one end 31$e$ to the second proximal portion electrode 45-2 is the second electrolyte (for example, the urine 99). Accordingly, the two types of electrolytes can be distinguishingly detected as described above.

As a result, the calibration processing (steps S108 to S110 in FIG. 4) can be performed in a state confirmed that the standard solution 98 is in contact so as to integrally cover the sodium ion sensitive electrode 41 and the potassium ion sensitive electrode 42, and then the urine measurement processing (steps S113 to S117 in FIG. 4) can be performed in a state confirmed that the urine 99 is in contact so as to integrally cover the sodium ion sensitive electrode 41 and the potassium ion sensitive electrode 42. Thus, reliability of measurement result (in this example, Na/K ratio) can be further enhanced.

(Third Exemplary Modification of Test Strip)

Figure 11B:
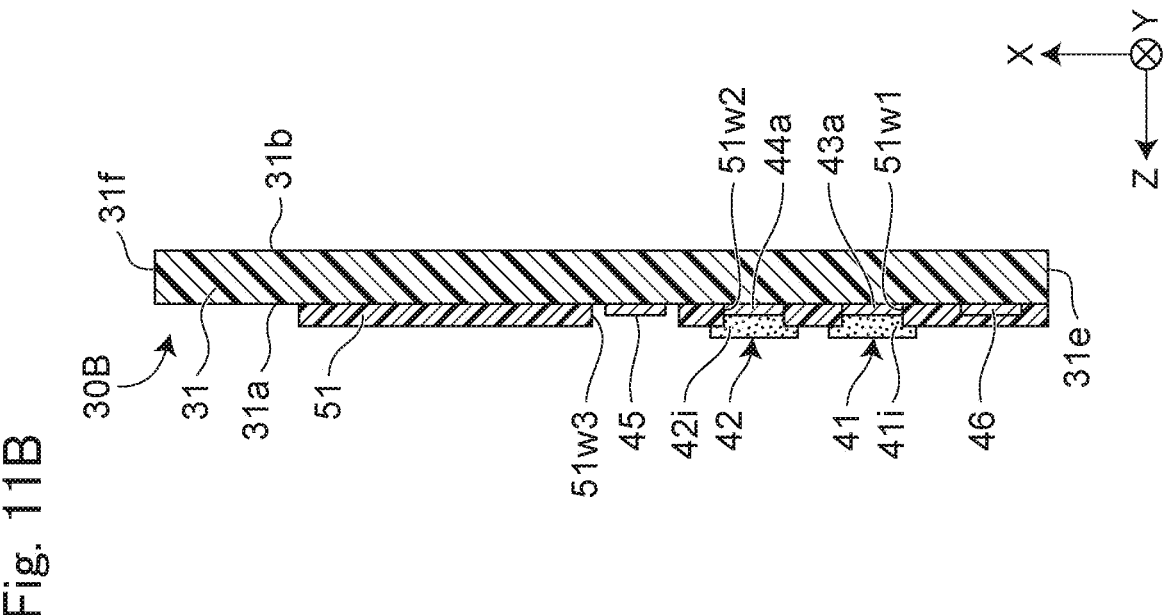
FIG. 11B is a view illustrating a cross section (end surface) taken along line XIB-XIB in FIG. 11A.
Figure 11A:
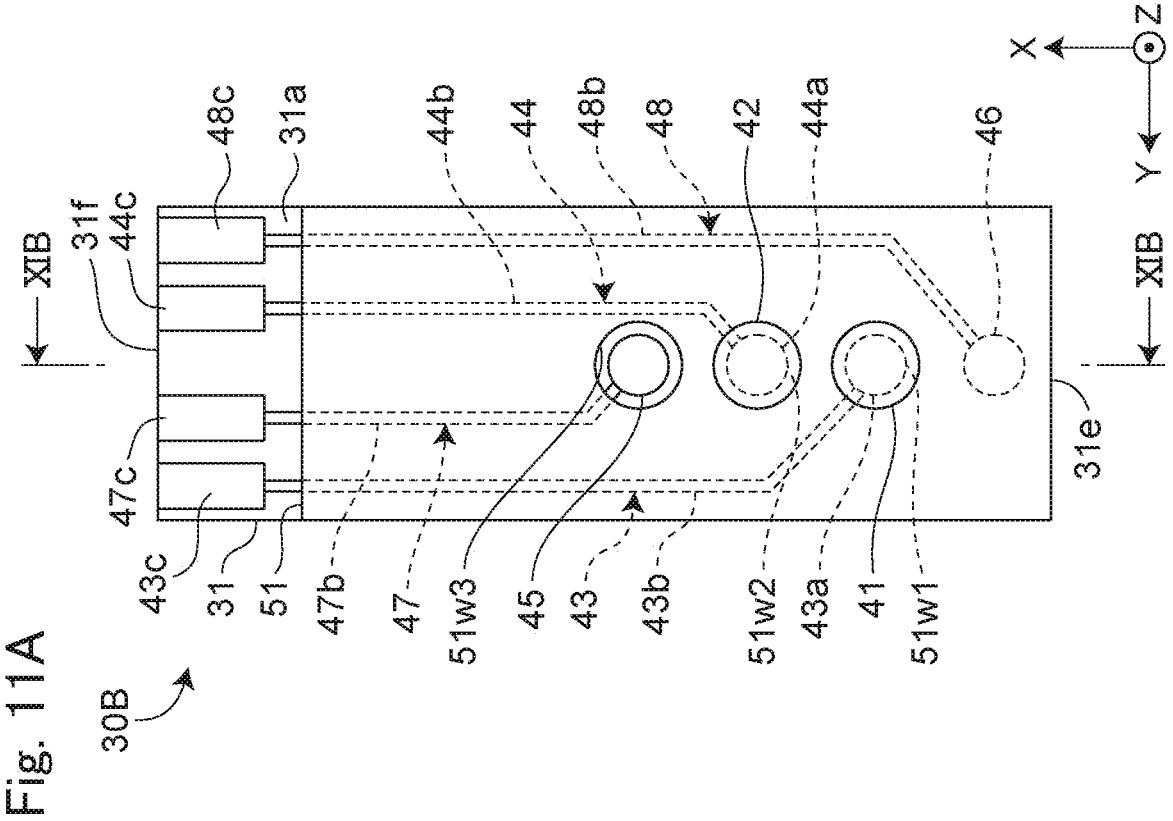
FIG. 11A is a view illustrating a planar layout of an electrolyte analysis test strip of yet another exemplary modification.

In the above example, in the test strip 30, the proximal portion electrode 45 and the distal portion electrode 46 constituting the solution detection electrode are exposed respectively through the openings 51$w$3 and 51$w$4 of the insulating film 51, but the present invention is not limited to this configuration. For example, as in a test strip 30B illustrated in FIGS. 11A and 11B, the distal portion electrode 46 may be covered with the insulating film 51. FIG. 11A illustrates a planar layout of the test strip 30B. FIG. 11B illustrates a cross section (end surface) taken along line XIB-XIB in FIG. 11A.

In a case of using the test strip 30B, the impedance measuring unit 14 of a main body 10 can detect an impedance between a proximal portion electrode 45 and a distal portion electrode 46 by applying, for example, an alternating-current voltage from the main body 10 side via the contact electrodes 21$b$ and 21$d$ of the connector 21.

In the test strip 30B, the distal portion electrode 46 is covered with the insulating film 51, so that the distal portion electrode 46 is protected and prevented from deteriorating. Not only the distal portion electrode 46 but also the proximal portion electrode 45 may be covered with the insulating film 51. In this case, the proximal portion electrode 45 is protected and prevented from deteriorating.

(Fourth Exemplary Modification of Test Strip)

Figure 12B:
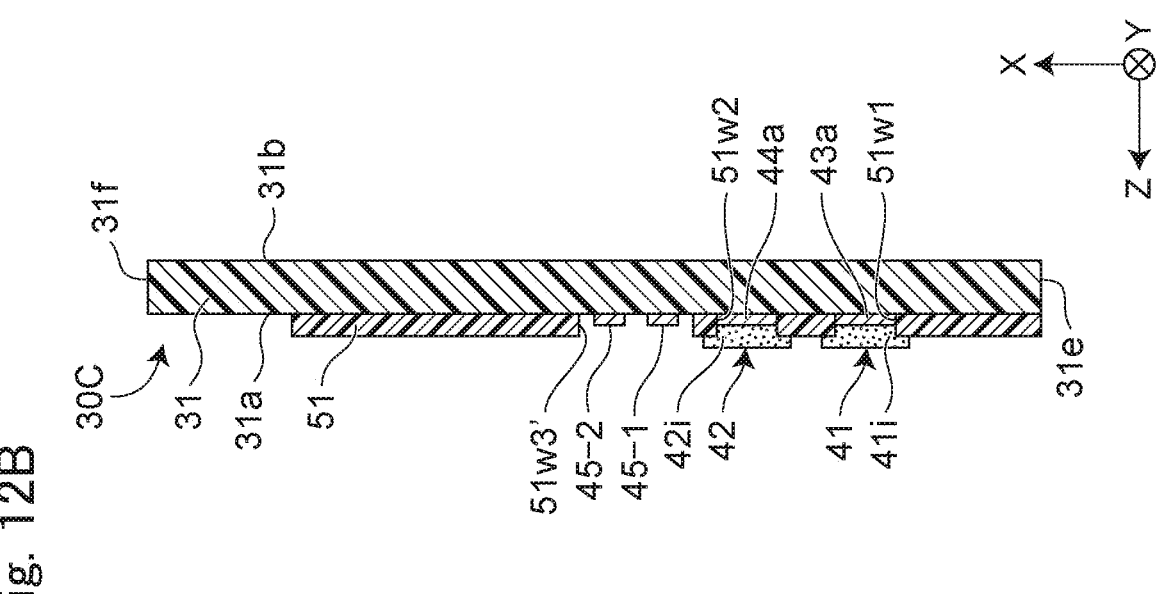
FIG. 12B is a view illustrating a cross section (end surface) taken along line XIIB-XIIB in FIG. 12A.
Figure 12A:
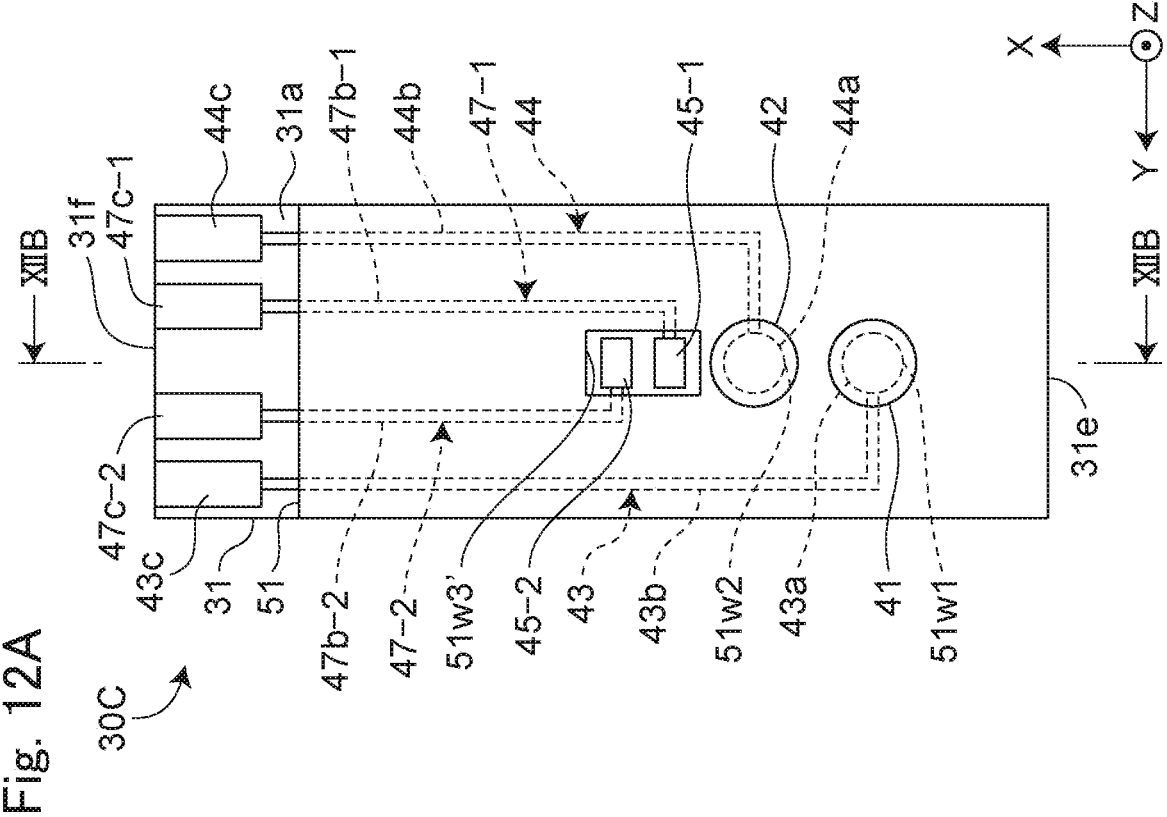
FIG. 12A is a view illustrating a planar layout of an electrolyte analysis test strip of yet another exemplary modification.

In the above example, in the test strip 30, both the proximal portion electrode 45 and the distal portion electrode 46 constituting the solution detection electrode are circular, but the present invention is not limited to this configuration. For example, as in a test strip 30C illustrated in FIGS. 12A and 12B, the proximal portion electrode(s) 45 may be formed in a rectangular shape. FIG. 12A illustrates a planar layout of the test strip 30C. FIG. 12B illustrates a cross section (end surface) taken along line XIIB-XIIB in FIG. 12A.

Similar to the test strip 30A illustrated in FIG. 10A, the test strip 30C includes a first proximal portion electrode 45-1 and a second proximal portion electrode 45-2 that serve as the proximal portion electrode 45 on the front surface 31$a$ of the substrate 31. The first proximal portion electrode 45-1 and the second proximal portion electrode 45-2 are separated from each other in the X direction. In the test strip 30C, unlike in the test strip 30A in FIG. 10A, the first proximal portion electrode 45-1 and the second proximal portion electrode 45-2 are each formed in a rectangular shape. Furthermore, the first proximal portion electrode 45-1 and the second proximal portion electrode 45-2 are exposed through one rectangular opening (defining a proximal region) 51$w$3' of the insulating film 51.

Furthermore, auxiliary extraction electrodes 47-1 and 47-2 extend to the side of the other end 31$f$ respectively from the first proximal portion electrode 45-1 and the second proximal portion electrode 45-2 in a manner separated from each other. The auxiliary extraction electrode 47-1 includes an elongated lead portion 47$b$-1 extending from the first proximal portion electrode 45-1 to the side of the other end 31$f$, and an electrode pad 47$c$-1 provided on the side of the other end 31$f$, continuing from the lead portion 47$b$-1, and wider than the lead portion 47$b$-1. The auxiliary extraction electrode 47-2 includes an elongated lead portion 47$b$-2 extending from the second proximal portion electrode 45-2 to the side of the other end 31$f$, and an electrode pad 47$c$-2 provided on the side of the other end 31$f$, continuing from the lead portion 47$b$-2, and wider than the lead portion 47$b$-2.

In this example, on the front surface 31$a$ of the substrate 31, the lead portions 43$b$, 47$b$-2, 47$b$-1, and 44$b$ are arrayed from the +Y side to the −Y side in this order in a manner separated from each other. Correspondingly, along the other end 31$f$ of the substrate 31, the electrode pads 43$c$, 47$c$-2, 47$c$-1, and 44$c$ are arrayed in this order in a manner separated from each other.

In a case of using the test strip 30C, the connector 21 of the main body 10 includes contact electrodes (not illustrated) that are brought into contact with the electrode pads 43$c$, 47$c$-2, 47$c$-1, and 44$c$, respectively. The potential difference measuring unit 12 (and the control unit 11) of the main body 10 measures the potential difference $\Delta E$ between the sodium ion sensitive electrode 41 and the potassium ion sensitive electrode 42 via the contact electrodes (not illustrated) of the connector 21 corresponding to the electrode pads 43$c$ and 44$c$. The impedance measuring unit 14 (and the control unit 11) of the main body 10 can detect an impedance between the first proximal portion electrode 45-1 and the second proximal portion electrode 45-2 via the contact electrodes (not illustrated) of the connector 21 corresponding to the electrode pads 47$c$-1 and 47$c$-2.

The test strip 30C is used under an assumption that the electrolyte is brought into contact with the test strip 30C so as to integrally cover a region from the one end 31$e$ to the proximal region 51$w$3' by the electrolyte contact operation performed by the user. Under this assumption, when the impedance between the first proximal portion electrode 45-1 and the second proximal portion electrode 45-2 decreases (specifically, as illustrated in FIG. 8, when the output level of the impedance measuring unit 14 decreases), it is determined that an electrolyte is brought into contact so as to integrally cover the region from the one end 31e to the proximal region 51w3'. With this determination, it can be said that the electrolyte is in contact so as to integrally cover the sodium ion sensitive electrode 41 and the potassium ion sensitive electrode 42. Accordingly, whether or not the electrolyte is in contact so as to integrally cover the sodium ion sensitive electrode 41 and the potassium ion sensitive electrode 42 can be determined according to the change in impedance between the first proximal portion electrode 45-1 and the second proximal portion electrode 45-2.

In the test strip 30C, the first proximal portion electrode 45-1 and the second proximal portion electrode 45-2 each have a rectangular shape and are disposed in one rectangular opening (defining the proximal region) 51w3' of the insulating film 51. Moreover, the distal portion electrode 46 is omitted. Thus, X direction dimensions and Y direction dimensions of the test strip 30C (substrate 31) can be reduced.

Figures 13A, 13B:
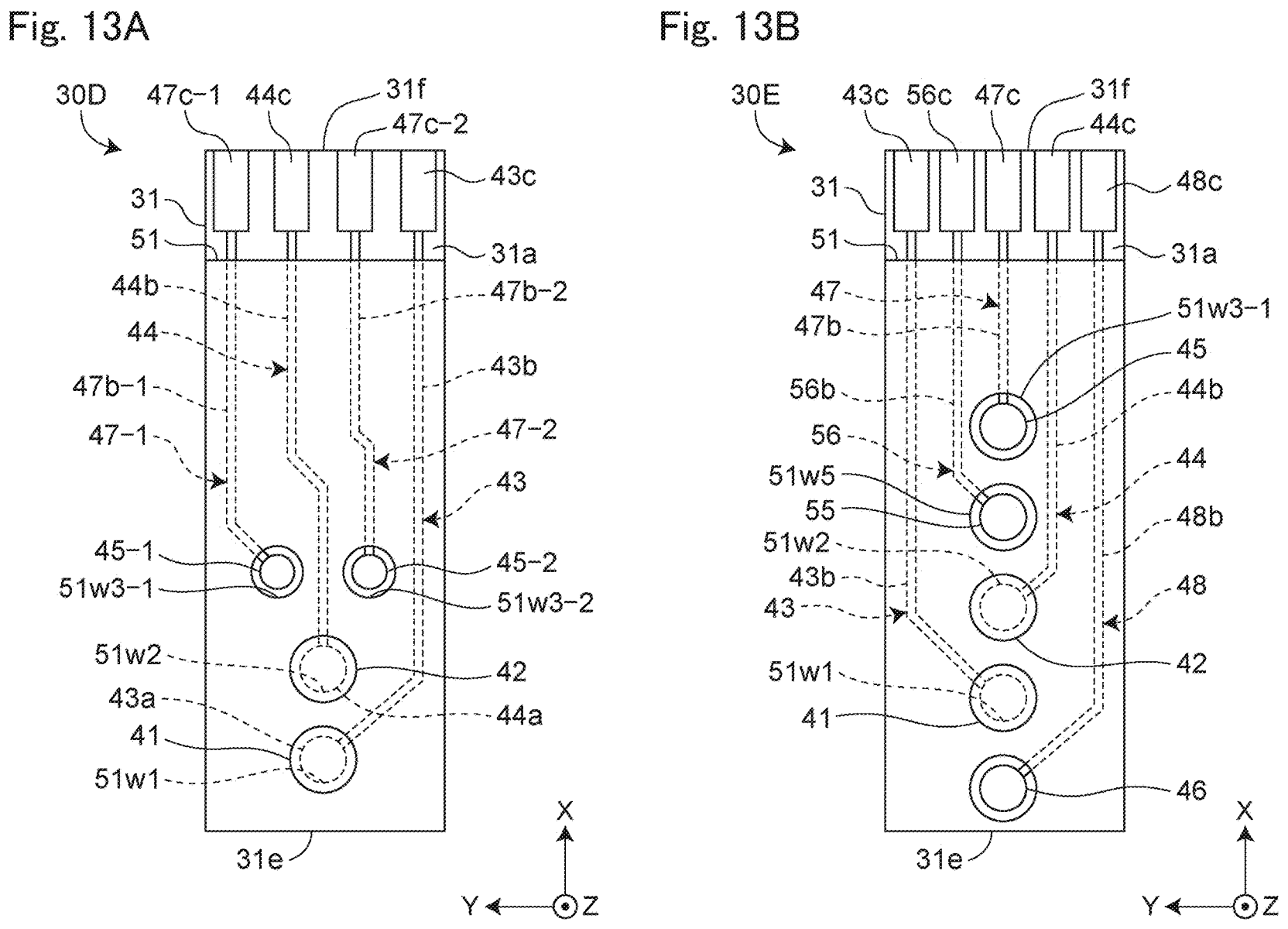

When determining whether or not the electrolyte is in contact so as to integrally cover the sodium ion sensitive electrode 41 and the potassium ion sensitive electrode 42 according to the change in impedance between the first proximal portion electrode 45-1 and the second proximal portion electrode 45-2, for example, the first proximal portion electrode 45-1 and the second proximal portion electrode 45-2 may be disposed side by side in the Y direction on the front surface 31a of the substrate 31 as in a test strip 30D illustrated in FIG. 13A. In the test strip 30D, a circular first proximal portion electrode 45-1 and a circular second proximal portion electrode 45-2 are disposed on the front surface 31a of the substrate 31 in a manner separated from each other in the Y direction. The first proximal portion electrode 45-1 and the second proximal portion electrode 45-2 are exposed respectively through circular openings (defining proximal regions) 51w3-1 and 51w3-2 of the insulating film 51. In this example, on the front surface 31a of the substrate 31, lead portions 47b-1, 44b, 47b-2, and 43b are arrayed from the +Y side to the −Y side in this order in a manner separated from each other. Correspondingly, along the other end 31f of the substrate 31, electrode pads 47c-1, 44c, 47c-2, and 43c are arrayed in this order in a manner separated from each other. The test strip 30D has the same function and effect as those of the test strip 30C.

(Fifth Exemplary Modification of Test Strip)

In the above example, in the test strip 30, two electrodes are used for detecting the concentration of ions in the electrolyte, that is, the sodium ion sensitive electrode 41 and the potassium ion sensitive electrode 42. However, the present invention is not limited to this configuration. For example, as in a test strip 30E illustrated in FIG. 13B, a reference electrode 55 that produces a reference potential for detecting the concentration of ions may be included.

In the test strip 30E, the circular reference electrode 55 is disposed between a potassium ion sensitive electrode 42 and a proximal portion electrode 45 on the front surface 31a of the substrate 31. A reference extraction electrode 56 extends from the reference electrode 55 to the side of the other end 31f. The reference extraction electrode 56 includes an elongated lead portion 56b extending from the reference electrode 55 to the side of the other end 31f, and an electrode pad 56c provided on the side of the other end 31f, continuing from the lead portion 56b, and wider than the lead portion 56b. In this example, on the front surface 31a of the substrate 31, the lead portions 43b, 56b, 47b, 44b, and 48b are arrayed from the +Y side to the −Y side in this order in a manner separated from each other. Correspondingly, along the other end 31f of the substrate 31, the electrode pads 43c,

56c, 47c, 44c, and 48c are arrayed in this order in a manner separated from each other. The reference electrode 55 and the reference extraction electrode 56 can be formed simultaneously with the other electrodes (the proximal portion electrode 45 and the distal portion electrode 46, etc.) by, for example, the above-described screen printing method.

In a case of using the test strip 30E, the connector 21 of the main body 10 includes contact electrodes (not illustrated) that are brought into contact with the electrode pads 43c, 56c, 47c, 44c, and 48c, respectively. The potential difference measuring unit 12 (and a control unit 11) of the main body 10 measures a potential difference ΔE between the potential indicated by the sodium ion sensitive electrode 41 and the reference potential indicated by the reference electrode 55 via the contact electrodes (not illustrated) of the connector 21 corresponding to the electrode pads 43c and 56c, and measures a potential difference ΔE between the potential indicated by the potassium ion sensitive electrode 42 and the reference potential indicated by the reference electrode 55 via the contact electrodes (not illustrated) of the connector 21 corresponding to the electrode pads 44c and 56c. With this, concentrations of sodium ions and the concentration of potassium ions in an electrolyte can be independently measured.

In the above examples, the sodium ion sensitive electrode 41 includes two layers of the base portion 43a made of a metal material and the cured sodium ion sensitive film 41i, and the potassium ion sensitive electrode 42 includes the base portion 44a made of a metal material and the cured potassium ion sensitive film 42i. However, the present invention is not limited to this configuration. Each of the sodium ion sensitive electrode 41 and the potassium ion sensitive electrode 42 may be a type of an electrode having an internal liquid.

Second Embodiment

Figures 14A, 14B:
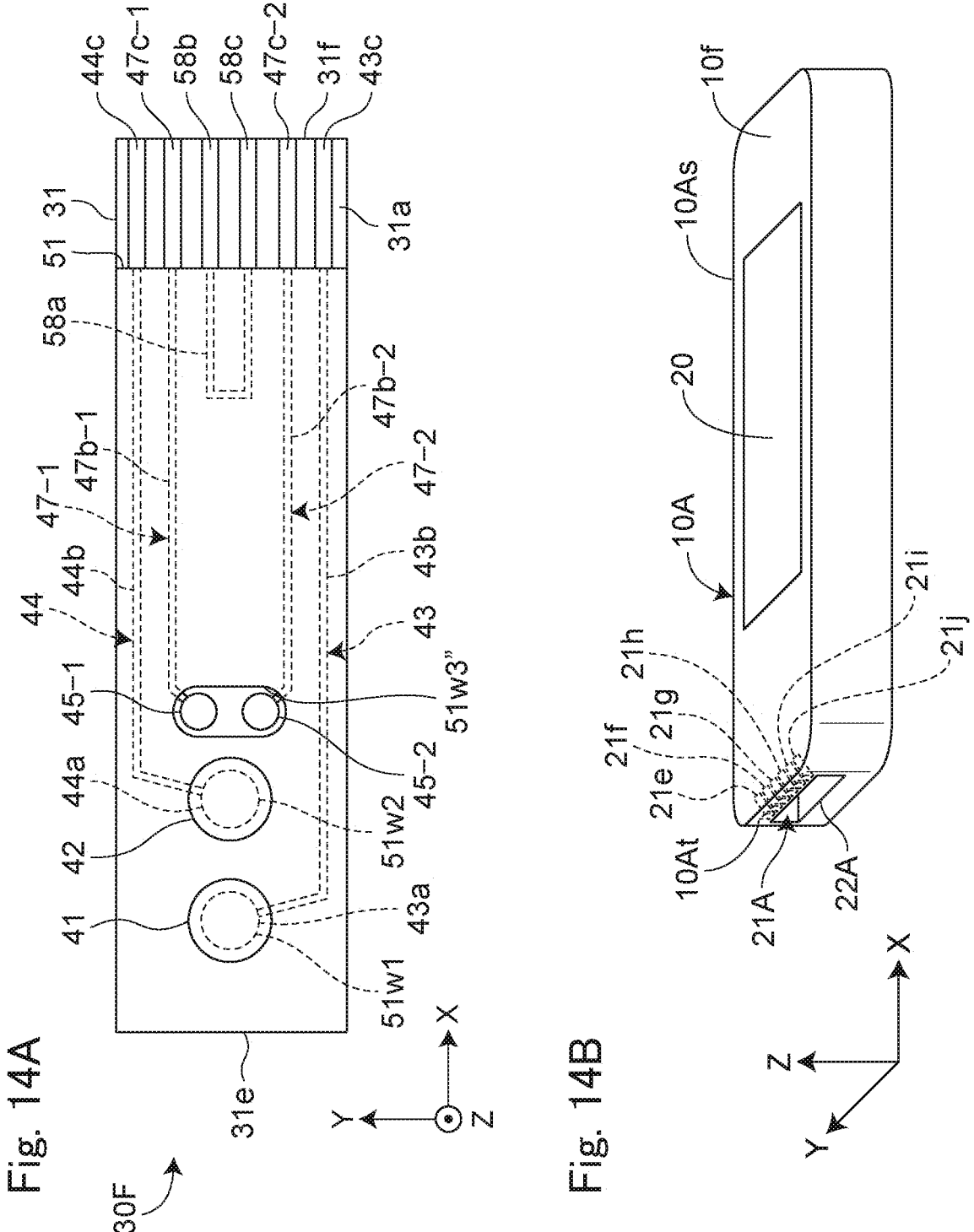
FIG. 14A is a view illustrating a planar layout of an electrolyte analysis test strip of another embodiment.
FIG. 14B is a view schematically illustrating a main body adapted to the electrolyte analysis test strip in FIG. 14A as viewed obliquely.

FIG. 14A illustrates a planar layout of a test strip 30F according to another embodiment. FIG. 14B schematically illustrates a main body 10A adapted to the test strip 30F in FIG. 14A as viewed obliquely. The test strip 30F and a main body 10A constitute an electrochemical sensor 90A as an electrolyte analysis device of a second embodiment illustrated in FIG. 15.

(Configuration of Test Strip)

Similar to the test strip 30 in FIG. 2A, the test strip 30F includes one elongated substrate 31 extending from one end 31e to an other end 31f in X direction, and includes, on a front surface 31a of the substrate 31, a sodium ion sensitive electrode 41 as a first ion sensitive electrode provided in a circular specific region 51w1 on the side of the one end 31e in the X direction, a potassium ion sensitive electrode 42 as a second ion sensitive electrode provided in another circular specific region 51w2 located closer to the other end 31f than the specific region 51w1, and first and second main extraction electrodes 43 and 44 respectively extending from the sodium ion sensitive electrode 41 and the potassium ion sensitive electrode 42 to the side of the other end 31f.

Similar to the test strip 30D illustrated in FIG. 13A, the test strip 30F has a circular first proximal portion electrode 45-1 and a circular second proximal portion electrode 45-2 that serve as the proximal portion electrode 45 on the front surface 31a of the substrate 31. The first proximal portion electrode 45-1 and the second proximal portion electrode 45-2 are separated from each other in the Y direction. The first proximal portion electrode 45-1 and the second proximal portion electrode 45-2 are exposed through one oval-shaped opening (defining a proximal region) 51w3" of an insulating film 51.

Furthermore, auxiliary extraction electrodes 47-1 and 47-2 extend to the side of the other end 31f respectively from the first proximal portion electrode 45-1 and the second proximal portion electrode 45-2 in a manner separated from each other. The auxiliary extraction electrode 47-1 includes an elongated lead portion 47b-1 extending from the first proximal portion electrode 45-1 to the side of the other end 31f, and an electrode pad 47c-1 provided on the side of the other end 31f, continuing from the lead portion 47b-1, and wider than the lead portion 47b-1. The auxiliary extraction electrode 47-2 includes an elongated lead portion 47b-2 extending from the second proximal portion electrode 45-2 to the side of the other end 31f, and an electrode pad 47c-2 provided on the side of the other end 31f, continuing from the lead portion 47b-2, and wider than the lead portion 47b-2.

In this example, on the front surface 31a of the substrate 31, the lead portions 44b, 47b-1, 47b-2, and 43b are arrayed from the +Y side to the −Y side in this order in a manner separated from each other. A conductive wire 58a having a substantially U-shape as a conductive layer is provided in a region located further on the side of the other end 31f than the proximal region 51w3" in the X direction and located between the lead portion 47b-1 and the lead portion 47b-2 in the Y direction. Both ends of the conductive wire 58a are directed toward the other end 31f. A pair of electrode pads 58b and 58c continuing from both ends of the conductive wire 58a are provided on the side of the other end 31f. Correspondingly, along the other end 31f of the substrate 31, the electrode pads 44c, 47c-1, 58b, 58c, 47c-2, and 43c are arrayed in this order in a manner separated from each other. The conductive wire 58a and the electrode pads 58b and 58c can be formed simultaneously with the other electrodes (the first proximal portion electrode 45-1 and the second proximal portion electrode 45-2, etc.) by, for example, the above-described screen printing method.

Similar to the test strip 30C in FIGS. 12A and 12B, the test strip 30F is used under an assumption that the electrolyte is brought into contact with the test strip 30F so as to integrally cover a region from the one end 31e to the proximal region 51w3" by the electrolyte contact operation performed by the user. Under this assumption, when the impedance between the first proximal portion electrode 45-1 and the second proximal portion electrode 45-2 decreases (specifically, when the output level of the impedance measuring unit 14 decreases as illustrated in FIG. 8), it is determined that the electrolyte is brought into contact with the test strip 30F so as to integrally cover the region from the one end 31e to the proximal region 51w3". With this determination, it can be said that the electrolyte is in contact so as to integrally cover the sodium ion sensitive electrode 41 and the potassium ion sensitive electrode 42. Accordingly, whether or not the electrolyte is in contact so as to integrally cover the sodium ion sensitive electrode 41 and the potassium ion sensitive electrode 42 can be determined according to the change in impedance between the first proximal portion electrode 45-1 and the second proximal portion electrode 45-2.

(Configuration of Main Body)

As illustrated in FIG. 14B, the main body 10A includes a housing 10As forming a substantially prismatic outer peripheral wall, a display unit 20 as a display screen provided substantially at the center of a front face (face on the +Z side) 10Af of the housing 10As, and a connector 21A provided on an end surface 10At on the −X side of the housing 10As. The connector 21A has a slot 22A that opens toward the −X side to detachably receive the test strip 30F. The housing 10As exposes the display unit 20 and the slot 22A while covering a rest region other than regions occupied by the display unit 20 and the slot 22A, with no component for operation (the operation unit 13 illustrated in FIG. 1B). Since no component for operation is provided on the outer peripheral wall of the main body 10A as described above, a configuration of the main body 10A is simplified.

In the slot 22A of the connector 21A, contact electrodes 21e, 21f, 21g, 21h, 21i, and 21j made of leaf springs bent in an L-shape are provided at places respectively corresponding to the electrode pads 44c, 47c-1, 58b, 58c, 47c-2, and 43c of the test strip 30F. When the user inserts the other end 31f of the test strip 30F in the slot 22A, the electrode pads 44c, 47c-1, 58b, 58c, 47c-2, and 43c come into contact with and are electrically connected to the contact electrodes 21e, 21f, 21g, 21h, 21i, and 21j, respectively. As a result, the first potential $E_1$ produced by the sodium ion sensitive electrode 41 of the test strip 30F and the second potential $E_2$ produced by the potassium ion sensitive electrode 42 of the test strip 30F are transmitted to the contact electrodes 21j and 21e via the first and second main extraction electrodes 43 and 44, respectively, and can be input to the main body 10A. Meanwhile, the first proximal portion electrode 45-1 and the second proximal portion electrode 45-2 constituting the solution detection electrode are electrically connected to the contact electrodes 21f and 21i via the auxiliary extraction electrodes 47-1 and 47-2, respectively. Thus, the impedance between the first proximal portion electrode 45-1 and the second proximal portion electrode 45-2 can be detected from the main body 10A side via the contact electrodes 21f and 21i. Furthermore, the electrode pads 58b and 58c continuous with both ends of the conductive wire 58a come into contact with the contact electrodes (additional contact electrodes) 21g and 21h, respectively. Thus, it can be detected from the main body 10A side via the contact electrodes 21g and 21h that the mounted state in which the side of the other end 31f of the test strip 30F is inserted in the slot 22A of the connector 21A being established. This allows a detection of the mounted state by a simple configuration.

Figure 15:
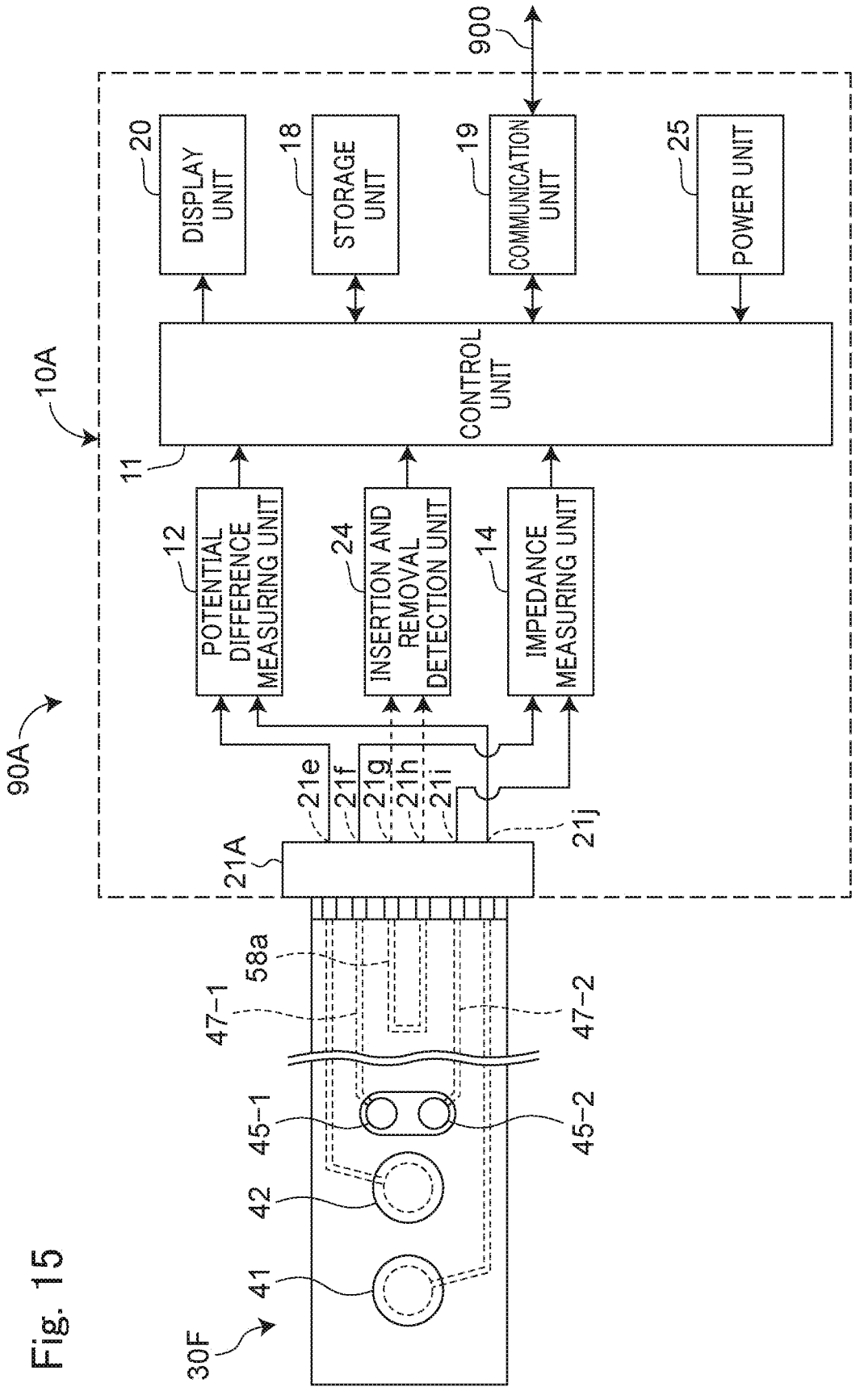
FIG. 15 is a diagram illustrating a block configuration of an electrochemical sensor as an electrolyte analysis device of a second embodiment including the electrolyte analysis test strip in FIG. 14A and the main body in FIG. 14B.

As illustrated in FIG. 15, in addition to the display unit 20 and the connector 21A described above, a control unit 11, a potential difference measuring unit 12, an impedance measuring unit 14, a storage unit 18, a communication unit 19, an insertion and removal detection unit 24 serving as a mounting detection unit, and a power unit 25 are mounted and housed in the main body 10A. Unlike the main body 10 of the first embodiment, an operation unit 13 is not mounted on the main body 10A. The control unit 11 includes a micro controller unit (MCU) including a central processing unit (CPU) operated by software, and controls the entire operation of the electrochemical sensor 90A as described later. The potential difference measuring unit 12 receives a potential difference ΔE between the sodium ion sensitive electrode 41 and the potassium ion sensitive electrode 42 of the test strip 30F via the contact electrodes 21j and 21e, amplifies the potential difference ΔE, and inputs the amplified potential difference ΔE to the control unit 11. The impedance measuring unit 14 measures the impedance between the first proximal portion electrode 45-1 and the second proximal portion electrode 45-2 via the contact electrodes 21f and 21i, and inputs the impedance to the control unit 11. The insertion and removal detection unit 24 detects whether or not the mounted state in which the side of the other end 31f of the test strip 30F is inserted in the slot 22A of the connector 21A being established, according to whether the contact electrodes 21g and 21h are open between them or short-circuited by the conductive wire 58a. The power unit 25 supplies an electrical power to the control unit 11, the display unit 20, the potential difference measuring unit 12, the impedance measuring unit 14, the storage unit 18, the communication unit 19, the insertion and removal detection unit 24, and other units in the main body 10A. The storage unit 18 and the communication unit 19 work similarly to those in the first embodiment.

(Electrolyte Analysis Method)

Figure 16:
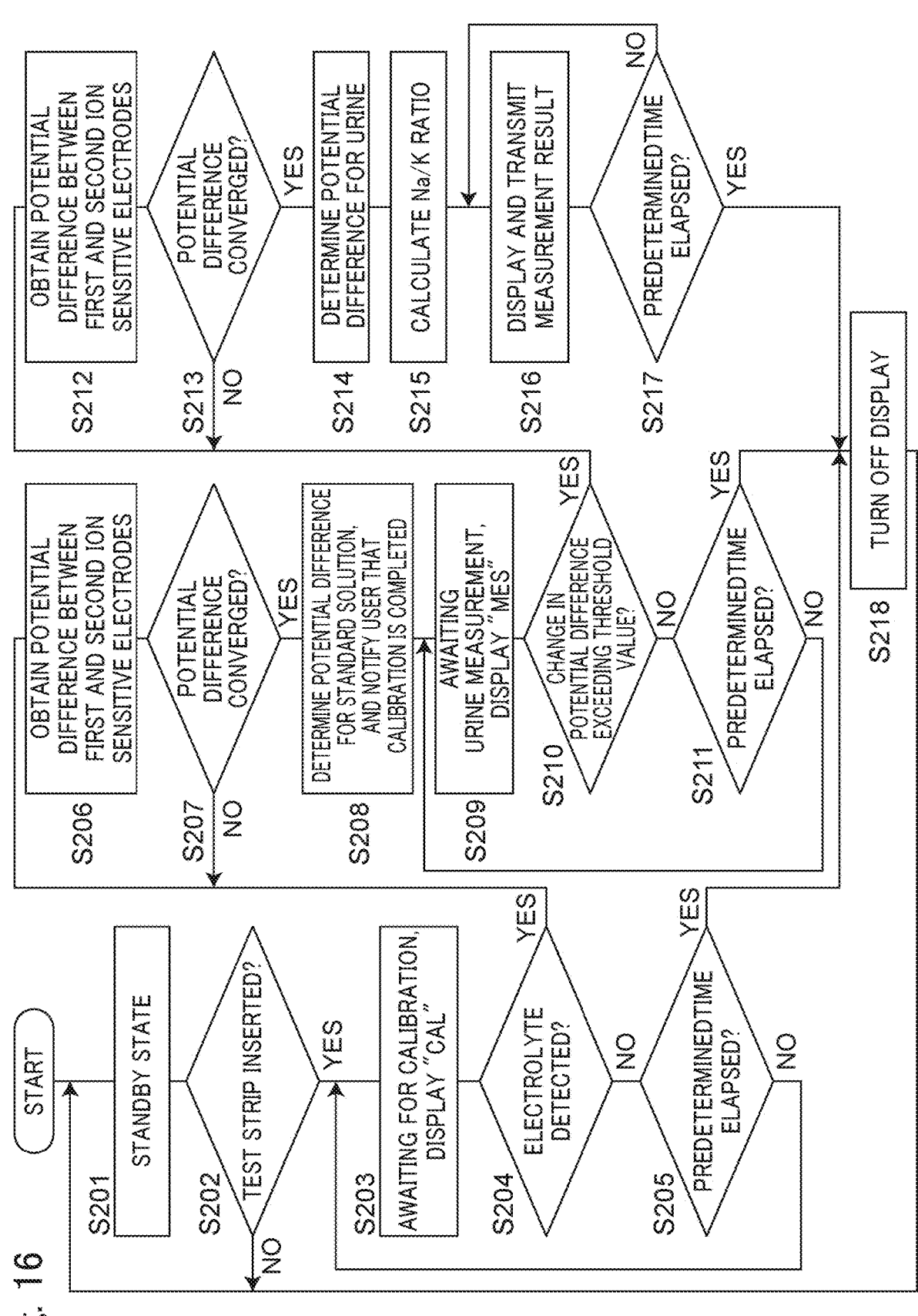
FIG. 16 is a diagram illustrating a flow of an electrolyte analysis method in which a subject as a user measures a concentration ratio between sodium ions and potassium ions in urine as an electrolyte using the electrochemical sensor in FIG. 14A.

FIG. 16 illustrates a flow of an electrolyte analysis method in which a subject as a user measures a concentration ratio between sodium ions and potassium ions in urine as an electrolyte using the electrochemical sensor 90A. Next, a measurement procedure performed by the user will be described with reference to FIGS. 17A to 17D and 18A to 18E in addition to FIG. 16.

Figure 17A:
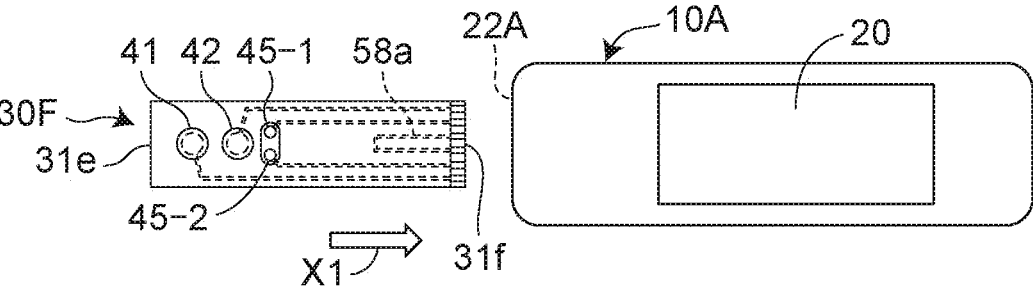
FIGS. 17A to 17D are figures schematically illustrating a (first half) procedure of the electrolyte analysis method.

Before a start of use by the user, the main body 10A is in a standby state (step S201 in FIG. 16). In the standby state, as illustrated in FIG. 17A, the display unit 20 is in a turned off state. In the main body 10A, the electrical power (voltage) is supplied from a power unit 25 only to the insertion and removal detection unit 24, and the power supply to units other than the insertion and removal detection unit 24 is stopped.

When using the electrochemical sensor 90A, as illustrated in FIG. 17A, the user first inserts the other end 31f of the test strip 30F in the slot 22A of the main body 10A as indicated by an arrow X1 to mount the test strip 30F on the main body 10A (YES in step S202 in FIG. 16). This is called "mounting operation". By this mounting operation, the electrode pads 44c, 47c-1, 58b, 58c, 47c-2, and 43c of the test strip 30F come into contact with and are electrically connected to the contact electrodes 21e, 21f, 21g, 21h, 21i, and 21j of the connector 21A, respectively.

Figure 17B:
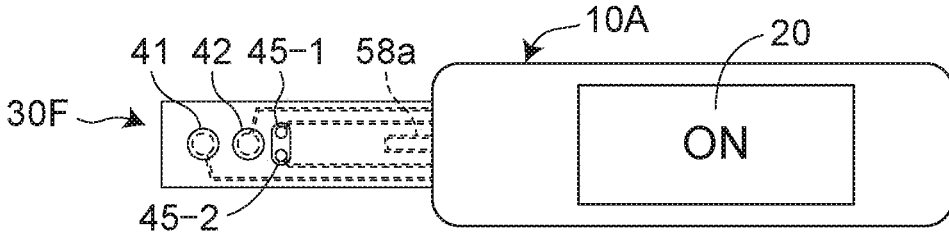

Then, the insertion and removal detection unit 24 of the main body 10A serves as a mounting detection unit to detect that the contact electrodes 21g and 21h have changed from an open state between them to a short-circuited state and thereby that the mounted state has been established, in which the side of the other end 31f of the test strip 30F has been is inserted in the slot 22A of the connector 21A. Triggered by the mounted state having been established, the control unit 11 serves as a power control unit to turn on the power of the main body 10A. That is, the electrical power is supplied from the power unit 25 to respective units in the main body 10A. As illustrated in FIG. 17B, the control unit 11 causes the display unit 20 to display a character string "ON" indicating that the power is turned on.

In this case, at the start of using the electrochemical sensor 90A, the user need not perform an action of turning on the power of the main body 10A besides the mounting operation. This improves user-friendliness. Moreover, there is no need to provide a power switch to the main body 10A.

Figure 17C:
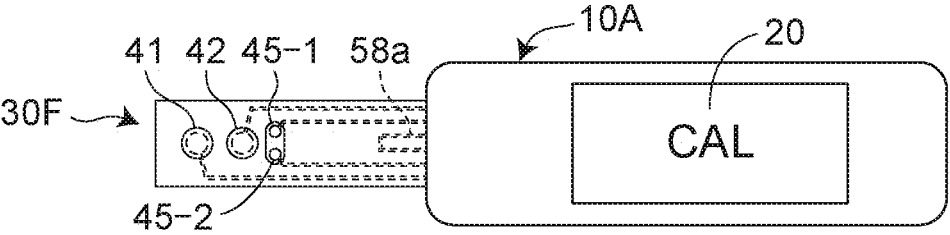
Figure 17D:
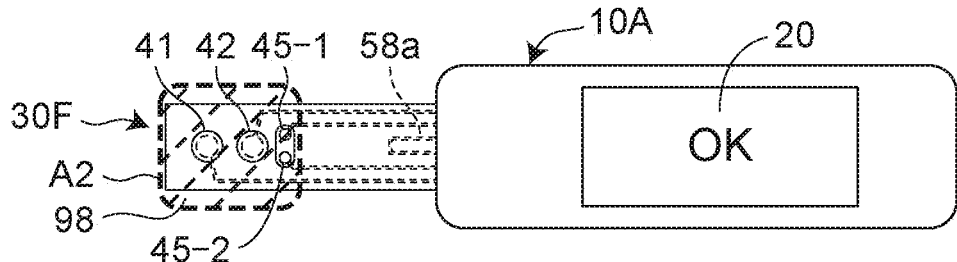

When the electrical power is supplied from the power unit 25 to the respective units in the main body 10A and the respective units of the main body 10A enter operable states (typically, a few seconds after "ON" is displayed), the control unit 11 causes the display unit 20 to display a character string "CAL" indicating awaiting for a calibration processing as illustrated in FIG. 17C (step S203 in FIG. 16). At the same time, the control unit 11 serves as a solution detection processing unit to start monitoring the output level of the impedance measuring unit 14 described above, and to determine whether or not the electrolyte (in this embodiment, standard solution) is in contact with the test strip 30F so as to integrally cover the region from the one end 31e to the proximal region 51w3" according to the output level of the impedance measuring unit 14 (step S204 in FIG. 16). It is assumed that the standard solution has a known concentration ratio Mr between the concentration of sodium ions and the concentration of potassium ions. When the contact of the electrolyte is not detected (NO in step S204), the control unit 11 returns to step S203 and waits until a predetermined time (in this example, three minutes) elapses while monitoring the output level of the impedance measuring unit 14 (NO in step S205). In this example, while the output level of the impedance measuring unit 14 is monitored, as illustrated in FIG. 17D, the user brings a standard solution 98 as an electrolyte into contact with the test strip 30F so as to integrally cover a region A2 (indicated by hatching with broken lines) extending from the one end 31e to the proximal region 51w3" (this is referred to as "electrolyte contact operation"). Then, the control unit 11 serves as a solution detection processing unit to determine that the electrolyte is in contact with the test strip 30F so as to integrally cover the region from the one end 31e to the proximal region 51w3" (thus, the electrolyte is in contact with the sodium ion sensitive electrode 41 and the potassium ion sensitive electrode 42 so as to integrally cover the sodium ion sensitive electrode 41 and the potassium ion sensitive electrode 42) according to the output level of the impedance measuring unit 14. When such a contact of the electrolyte is detected (YES in step S204 in FIG. 16), the control unit 11 proceeds, triggered by the detection of the contact of the electrolyte, to step S206 described later to start the calibration processing. Note that, when a predetermined time (in this example, three minutes) elapses with no detection of the contact of the electrolyte (YES in step S205), the control unit 11 determines that the electrolyte contact operation is not performed, turns off the display unit 20 (step S218), and returns the main body 10A to the standby state (step S201).

In this case, at the start of the calibration, the user need not perform an action such as turning on a calibration switch besides performing the operation of bringing the standard solution 98 into contact. This improves user-friendliness. Moreover, there is no need to provide a calibration switch to the main body 10A.

When the standard solution 98 is brought into contact with the sodium ion sensitive electrode 41 and the potassium ion sensitive electrode 42 in step S204 in FIG. 16 (YES in step S204), the sodium ion sensitive electrode 41 and the potassium ion sensitive electrode 42 respectively produce a first potential (referred to as $E_{1r}$) corresponding to the concentration of sodium ions and a second potential (referred to as $E_{2r}$) corresponding to the concentration of potassium ions.

In step S206, the control unit 11 serves as a calibration processing unit to monitor the potential difference $\Delta E$ ($=E_{1r}-E_{2r}$) between the sodium ion sensitive electrode 41 and the potassium ion sensitive electrode 42 of the test strip 30F via the potential difference measuring unit 12. As illustrated in "CALIBRATING" period in FIG. 9, the potential difference $\Delta E$ converges to a value (in this example, Er) corresponding to the concentration ratio between sodium ions and potassium ions in the standard solution 98 (for example, fluctuation becomes 2 mV or less in 5 seconds). In this example, the potential difference $\Delta E$ converges to Er at time t1 indicated in FIG. 9. When the potential difference $\Delta E$ converges to Er (YES in step S207 in FIG. 16), the control unit 11 determines the potential difference $\Delta E$ for the standard solution 98 to be Er, and obtains the sensitivity $S_1$ based on the above-described equation (Eq. 1) using the potential difference Er and the concentration ratio Mr (a calibration completed). At the same time, the user is notified that the calibration is completed. In this example, as illustrated in FIG. 17D, the control unit 11 causes the display unit 20 to display a character string "OK" indicating that the calibration is completed (step S208 in FIG. 16).

Figure 18A:
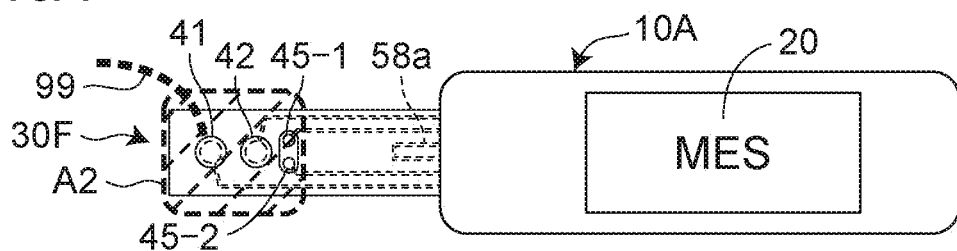
FIGS. 18A to 18E are figures schematically illustrating a (second half) procedure of the electrolyte analysis method.

Next, as illustrated in FIG. 18A, the control unit 11 displays a character string "MES" indicating that a urine measurement is awaited on the display unit 20 (step S209 in FIG. 16). The user who sees the display performs an operation of replacing the electrolyte that is in contact so as to integrally cover the region A2 from the standard solution 98 to urine 99 as a measurement target solution.

By this operation, the sodium ion sensitive electrode 41 and the potassium ion sensitive electrode 42 come into contact with the urine 99 to respectively produce the first potential $E_1$ corresponding to the concentration of sodium ions and the second potential $E_2$ corresponding to the concentration of potassium ions.

Figure 9:
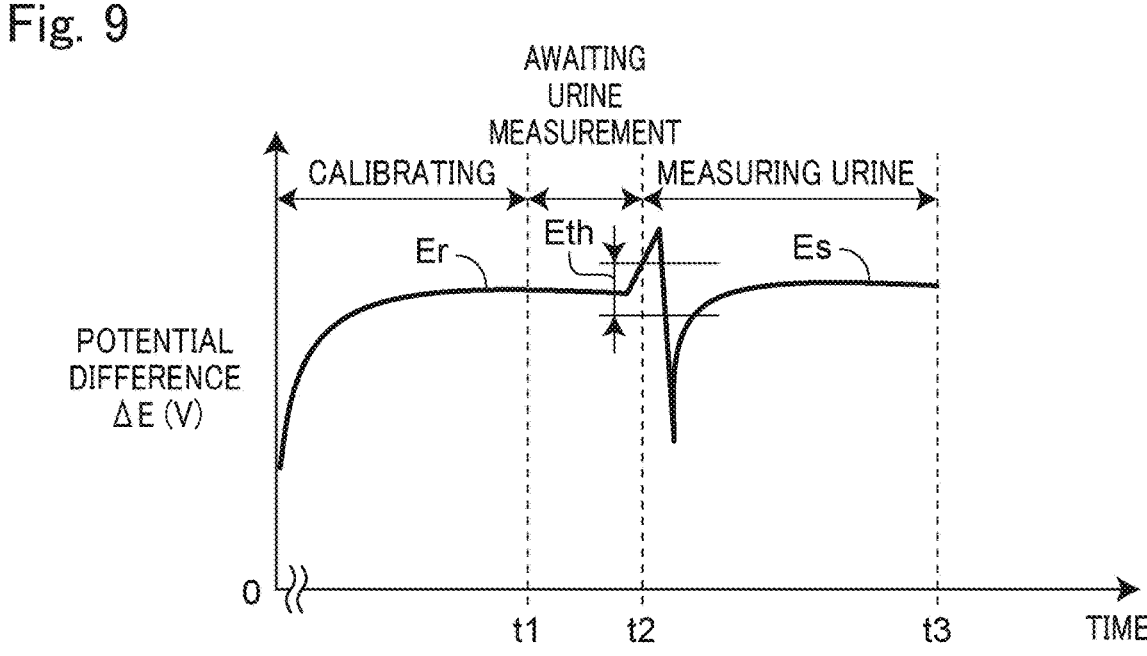
FIG. 9 is a chart illustrating a change in potential difference between a sodium ion sensitive electrode and a potassium ion sensitive electrode included in the electrolyte analysis test strip.

As illustrated in "AWAITING URINE MEASUREMENT" period in FIG. 9, the potential difference $\Delta E$ temporarily fluctuates as the electrolyte is replaced. In this example, the control unit 11 serves as a calculation unit to determine whether or not the potential difference $\Delta E$ (=$E_{1r}$–$E_{2r}$) between the sodium ion sensitive electrode 41 and the potassium ion sensitive electrode 42 of the test strip 30F shows a change exceeding a predetermined threshold value Eth (in this example, Eth=Er±5 mV) illustrated in FIG. 9 (step S210 in FIG. 16). When the potential difference $\Delta E$ shows such a change exceeding the threshold value Eth (YES in step S210), the control unit 11 determines that the electrolyte has been replaced from the standard solution 98 to the urine 99. In this example, it is determined that the potential difference $\Delta E$ has changed to exceed the threshold value Eth at time t2 indicated in FIG. 9. Triggered by the potential difference $\Delta E$ showing a change exceeding the threshold value Eth, the control unit 11 proceeds to step S212 in FIG. 16 described later to start a urine measurement processing. Note that, when a predetermined time (in this example, three minutes) elapses with no detection of the potential difference $\Delta E$ exceeding the threshold value Eth (YES in step S211), the control unit 11 determines that the operation of replacing the electrolyte is not performed, turns off the display unit 20 (step S218), and returns the main body 10A to the standby state (step S201).

In this case, at the start of measuring the measurement target solution, the user need not perform an action such as turning on a measurement switch besides performing the operation of bringing the measurement target solution into contact. This improves user-friendliness. Moreover, there is no need to provide a measurement switch to the main body 10A.

Figure 18B:
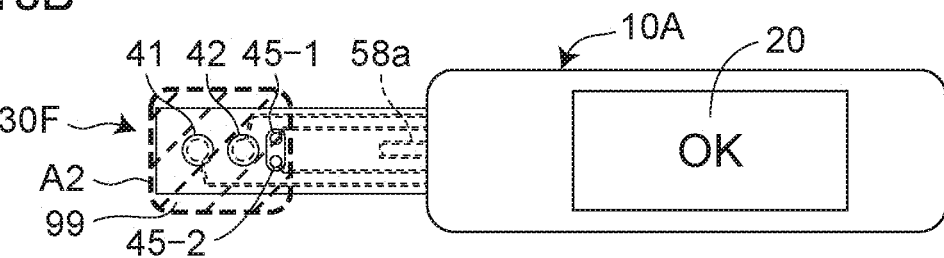

In step S212 in FIG. 16, the control unit 11 serves as a calculation unit to monitor the potential difference $\Delta E$ (=$E_1$–$E_2$) between the sodium ion sensitive electrode 41 and the potassium ion sensitive electrode 42 of the test strip 30F via the potential difference measuring unit 12. As illustrated in "MEASURING URINE" period in FIG. 9, the potential difference $\Delta E$ converges again to a value (in this example, Es) corresponding to the concentration ratio between sodium ions and potassium ions in the urine 99 (for example, the fluctuation becomes 2 mV or less in 5 seconds). In this example, the potential difference $\Delta E$ converges to Es at time t3 indicated in FIG. 9. When the potential difference $\Delta E$ converges to Es (YES in step S213 in FIG. 16), the control unit 11 determines the potential difference $\Delta E$ for the urine 99 to be Es (step S214 in FIG. 16). At the same time, as illustrated in FIG. 18B, the control unit 11 causes the display unit 20 to display a character string "OK" indicating that the potential difference $\Delta E$ is determined.

Subsequently, the control unit 11 serves as a calculation unit to calculate the concentration ratio Ms (=$C_1/C_2$) (that is, Na/K ratio) for urine 99 based on the above-described equation (Eq. 1) using the sensitivity $S_1$ obtained in step S208 in FIG. 16 and the potential difference Es (step S215 in FIG. 16).

Figure 18C:
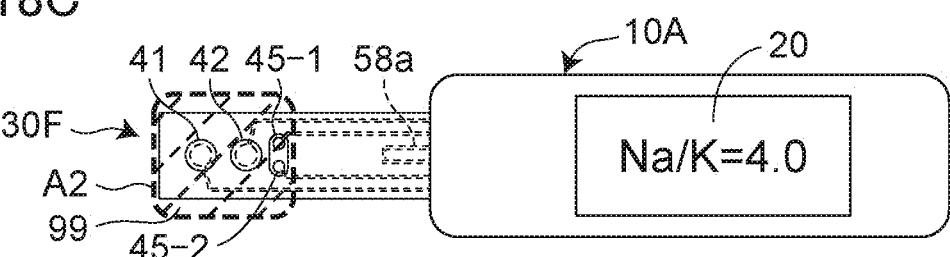
Figure 18D:
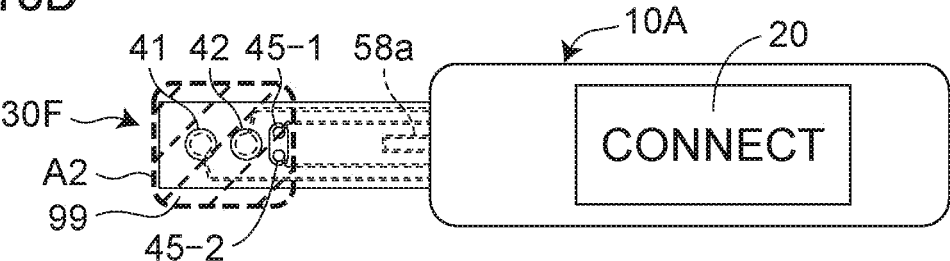
Figure 18E:
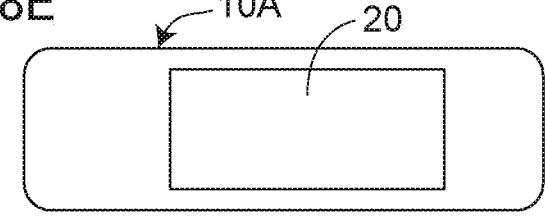

Subsequently, the control unit 11 causes the display unit 20 to display the measurement result (in this example, Na/K ratio) (step S216 in FIG. 16). For example, the Na/K ratio as a measurement result is 4.0. In this case, as illustrated in FIG. 18C, the display unit 20 is caused to display a character string "Na/K=4.0" indicating the measurement result. At the same time, in this example, the control unit 11 operates the communication unit 19 to transmit information indicating the measured value data (that is, Na/K ratio) to another device (in this example, a server) via the network 900. In this case, as illustrated in FIG. 18D, the control unit 11 causes the display unit 20 to display a character string "CONNECT" indicating that the measured value data is being transmitted.

Thereafter, the control unit 11 waits until a predetermined time (in this example, three minutes) elapses, and when the predetermined time elapses (YES in step S217), the control unit 11 turns off the display unit 20 (step S218) and returns the main body 10A to the standby state (step S201).

As described above, in the flow of the electrolyte analysis method, in step S204 in FIG. 16, it is determined whether or not the standard solution 98 has come into contact with the test strip 30F so as to integrally cover the region from the one end 31e to the proximal region 51w3" according to the output level of the impedance measuring unit 14. Thus, it can be confirmed that the standard solution 98 is in contact so as to integrally cover the sodium ion sensitive electrode 41 and the potassium ion sensitive electrode 42. Furthermore, in the flow of the electrolyte analysis method, in step S210 in FIG. 16, it is determined whether or not the electrolyte has been replaced from the standard solution 98 to the urine 99. Thus, it can be confirmed that the electrolyte that is in contact so as to integrally cover the sodium ion sensitive electrode 41 and the potassium ion sensitive electrode 42 is the urine 99 as the measurement target solution. By performing the calibration processing (steps S206 to S208 in FIG. 16) in a state confirmed that the standard solution 98 is in contact, and then performing the urine measurement processing (steps S212 to S216 in FIG. 16) in a state confirmed that the electrolyte has been replaced from the standard solution 98 to the urine 99, reliability of measurement result (in this example, Na/K ratio) can be enhanced.

In the above embodiment, a case where the concentration ratio between sodium ions and potassium ions as the first and second ion species is measured has been described, but the present invention is not limited to this configuration. The electrolyte analysis test strip of the present invention and the electrolyte analysis device including the test strip can be applied to a measurement of a concentration ratio between various ions other than sodium ions and potassium ions, such as calcium ions, chloride ions, lithium ions, nitrate ions, nitrite ions, sulfate ions, sulfite ions, iodide ions, magnesium ions, bromide ions, perchlorate ions, and hydrogen ions. In order to perform calculation based only on the potential difference produced by the first and second ion sensitive films without a reference electrode, the first and second ion species need to have almost the same ion valence. In a case where only one ion sensitive electrode for measuring a concentration of ions and a reference electrode that produces a reference potential are provided on a main surface of a test strip, the concentration of the ions in the electrolyte can be measured alone.

As described above, in a first aspect, an electrolyte analysis test strip of the present disclosure is an electrolyte analysis test strip for measuring a concentration of ions contained in an electrolyte, the electrolyte analysis test strip comprising:

a substrate extending in one direction from one end to an other end;

an ion sensitive electrode that is provided in a specific region on a side of the one end in the one direction on a main surface of the substrate, and is for measuring a concentration of the ions;

a main extraction electrode extending from the ion sensitive electrode to a side of the other end;

a solution detection electrode that is provided in a proximal region located between the specific region and the other end in the one direction on the main surface in a manner separated from the main extraction electrode, and is for detecting whether or not the solution detection electrode is in contact with the electrolyte; and an auxiliary extraction electrode extending from the solution detection electrode to the side of the other end in a manner separated from the main extraction electrode, wherein the solution detection electrode includes a proximal portion electrode provided in the proximal region, and a distal portion electrode that is provided in a distal region located between the specific region and the one end in the one direction on the main surface, and is for detecting whether or not the distal portion electrode is in contact with the electrolyte, and the auxiliary extraction electrode extends from each of the distal portion electrode and the proximal portion electrode to the side of the other end in a manner separated from each other.

The "electrolyte" broadly means a solution containing at least one ion species.

The "main surface" of the substrate means a plate surface that spatially expands and is not an end surface.

The "side of the one end" means a side close to the one end, of the one end and the other end, regarding the one direction. The "side of the other end" means a side close to the other end, of the one end and the other end, regarding the one direction.

To bring the electrolyte into "contact" with the electrolyte analysis test strip (in particular, the solution detection electrode), a user (typically, a subject) may sprinkle the electrolyte on the electrolyte analysis test strip so as to integrally cover from the one end to the proximal region, or may immerse the electrolyte analysis test strip in the electrolyte from the one end to the proximal region.

When using the electrolyte analysis test strip according to the present disclosure, the side of the other end in the one direction is inserted in a connector of a main body of an electrolyte analysis device described later. In this state (referred to as "mounted state"), to perform measurement, the user brings the electrolyte into contact with the electrolyte analysis test strip so as to integrally cover from the one end to the proximal region in which the solution detection electrode is provided, including the specific region in which the ion sensitive electrode is provided (this is referred to as "electrolyte contact operation"). The electrolyte is thereby brought into contact with the ion sensitive electrode and the solution detection electrode so as to integrally cover them. Such a contact of the electrolyte with the solution detection electrode can be detected by a component (for example, a solution detection processing unit to be described later) included in the main body of the electrolyte analysis device via the auxiliary extraction electrode. For example, an impedance between the solution detection electrode and the ion sensitive electrode decreases. This decrease in impedance can be detected, for example, by the component included in the main body of the electrolyte analysis device via the main extraction electrode and the auxiliary extraction electrode. When the contact of the electrolyte with the solution detection electrode (provided in the proximal region) is detected, it is determined that the electrolyte is in contact with the ion sensitive electrode so as to cover the ion sensitive electrode, under an assumption that the electrolyte contact operation is performed to cause the electrolyte to contact the electrolyte analysis test strip so as to integrally cover from the one end to the proximal region.

Furthermore, in the electrolyte analysis test strip, the solution detection electrode includes the proximal portion electrode provided in the proximal region and the distal portion electrode provided in the distal region located between the specific region and the one end in the one direction on the main surface, and is for detecting whether or not the distal portion electrode is in contact with the electrolyte. Thus, when the user performs the electrolyte contact operation in the mounted state, the electrolyte comes into contact with the distal portion electrode, the ion sensitive electrode, and the proximal portion electrode so as to integrally cover them. This reduces an impedance between the distal portion electrode and the proximal portion electrode. This decrease in impedance can be detected by a component (for example, the solution detection processing unit to be described later) included in the main body of the electrolyte analysis device via the auxiliary extraction electrodes that respectively extend from the distal portion electrode and the proximal portion electrode to the side of the other end in a manner separated from each other. Thus, it can be determined that the electrolyte is in contact with the ion sensitive electrode so as to cover the ion sensitive electrode. Moreover, in the electrolyte analysis test strip of this one embodiment, since the ion sensitive electrode is disposed between the distal portion electrode and the proximal portion electrode in the one direction, it can be said that the electrolyte is in contact with the ion sensitive electrode so as to cover the ion sensitive electrode when the impedance between the distal portion electrode and the proximal portion electrode decreases. Thus, whether or not the electrolyte is in contact with the ion sensitive electrode so as to cover the ion sensitive electrode can be determined.

When it is determined that the electrolyte is in contact with the ion sensitive electrode so as to cover the ion sensitive electrode, this determination serves as a trigger and a potential change of the ion sensitive electrode can be detected by a component included in the main body of the electrolyte analysis device via the main extraction electrode. A concentration of ions contained in the electrolyte can be measured based on the potential change. When a measurement is performed in a state confirmed that the electrolyte is in contact with the ion sensitive electrode so as to cover the ion sensitive electrode as described above, reliability of measurement result (ion concentration) is enhanced.

In the electrolyte analysis test strip of one embodiment, the proximal portion electrode, the ion sensitive electrode, and the distal portion electrode are aligned along the one direction.

In a second aspect, an electrolyte analysis test strip of the present disclosure is an electrolyte analysis test strip for measuring a concentration of ions contained in an electrolyte, the electrolyte analysis test strip comprising:

a substrate extending in one direction from one end to an other end;

an ion sensitive electrode that is provided in a specific region on a side of the one end in the one direction on a main surface of the substrate, and is for measuring a concentration of the ions;

a main extraction electrode extending from the ion sensitive electrode to a side of the other end;

a solution detection electrode that is provided in a proximal region located between the specific region and the other end in the one direction on the main surface in a manner separated from the main extraction electrode, and is for detecting whether or not the solution detection electrode is in contact with the electrolyte; and an auxiliary extraction electrode extending from the solution detection electrode to the side of the other end in a manner separated from the main extraction electrode, wherein the solution detection electrode includes a first proximal portion electrode and a second proximal portion electrode that are provided in the proximal region in a manner separated from each other, and the auxiliary extraction electrode extends from each of the first proximal portion electrode and the second proximal portion electrode to the side of the other end in a manner separated from each other.

In the electrolyte analysis test strip of the present disclosure, the solution detection electrode includes the first proximal portion electrode and the second proximal portion electrode that are provided in the proximal region in a manner separated from each other. A change in impedance between the first proximal portion electrode and the second proximal portion electrode can be detected by a component (for example, the solution detection processing unit to be described later) included in the main body of the electrolyte analysis device via the auxiliary extraction electrodes that respectively extend from the first and second proximal portion electrodes to the side of the other end in a manner separated from each other. Thus, it can be determined whether or not the electrolyte is in contact with the ion sensitive electrode so as to cover the ion sensitive electrode according to the change in impedance between the first proximal portion electrode and the second proximal portion electrode, under an assumption that the electrolyte contact operation is performed to cause the electrolyte to contact the electrolyte analysis test strip so as to integrally cover from the one end to the proximal region.

In the electrolyte analysis test strip of one embodiment, the first proximal portion electrode and the second proximal portion electrode are separated from each other in the one direction.

In the electrolyte analysis test strip of this one embodiment, the first proximal portion electrode and the second proximal portion electrode are separated from each other in the one direction. Thus, when a range in the one direction to be brought into contact with the electrolyte from the one end is previously set different for two types of electrolytes (referred to as "first electrolyte" and "second electrolyte"; for example, the first electrolyte may be a standard solution whose concentration ratio is known and the second electrolyte may be urine as a measurement target), the first and second proximal portion electrodes can distinguishingly detect the two types of electrolyte. Specifically, it is assumed that the first proximal portion electrode is disposed closer to the one end than the second proximal portion electrode in the one direction. In this case, for example, a range in the one direction to be brought into contact with the first electrolyte by the electrolyte contact operation is adjusted in advance to such a range integrally covering from the one end to the first proximal portion electrode but not reaching the second proximal portion electrode. Meanwhile, a range in the one direction to be immersed in the second electrolyte by the electrolyte contact operation is adjusted in advance to such a range integrally covering from the one end to the second proximal portion electrode beyond the first proximal portion electrode. Thus, when a component (for example, the solution detection processing unit to be described later) included in the main body of the electrolyte analysis device detects via the auxiliary extraction electrodes that the electrolyte is in contact with the first proximal portion electrode but is not in contact with the second proximal portion electrode, it can be recognized that the electrolyte that is currently in contact so as to cover from the one end to the first proximal portion electrode is the first electrolyte. When a component (for example, the solution detection processing unit to be described later) included in the main body of the electrolyte analysis device detects via the auxiliary extraction electrodes that the electrolyte is in contact with the second proximal portion electrode as well as with the first proximal portion electrode, it can be recognized that the electrolyte that is currently in contact so as to cover from the one end to the second proximal portion electrode is the second electrolyte. Accordingly, the two types of electrolyte can be distinguishingly detected as described above.

In the electrolyte analysis test strip of one embodiment, the electrolyte contains a first ion species and a second ion species different from each other, the ion sensitive electrode includes a first ion sensitive electrode and a second ion sensitive electrode that are provided in the specific region in a manner separated from each other, the first ion sensitive electrode producing, when brought into contact with the electrolyte, a first potential corresponding to a concentration of the first ion species, the second ion sensitive electrode producing, when brought into contact with the electrolyte, a second potential corresponding to a concentration of the second ion species, and the main extraction electrode includes a first main extraction electrode and a second main extraction electrode that respectively extend from the first ion sensitive electrode and the second ion sensitive electrode to the side of the other end in a manner separated from each other.

In the electrolyte analysis test strip of this one embodiment, the ion sensitive electrode includes the first ion sensitive electrode and the second ion sensitive electrode provided in the specific region in a manner separated from each other. The first ion sensitive electrode produces the first potential corresponding to the concentration of the first ion species by making contact with the electrolyte, and the second ion sensitive electrode produces the second potential corresponding to the concentration of the second ion species by making contact with the electrolyte. The first and second potentials are transmitted to the side of the other end respectively via the first and second main extraction electrodes. The first and second potentials transmitted to the side of the other end can be detected by a component (for example, a calculation unit to be described later) included in the main body of the electrolyte analysis device. Thus, a concentration ratio between the first ion species and the second ion species contained in the electrolyte can be calculated based on a potential difference between the first and second potentials.

The electrolyte analysis test strip of one embodiment further comprises:

a reference electrode that is provided in the specific region in a manner separated from the first ion sensitive electrode and the second ion sensitive electrode, the reference electrode producing a reference potential when brought into contact with the electrolyte; and a reference extraction electrode extending from the reference electrode to the side of the other end in a manner separated from the first main extraction electrode and the second main extraction electrode.

In the electrolyte analysis test strip of this one embodiment, the reference potential is transmitted from the reference electrode to the side of the other end via the reference extraction electrode. The reference potential transmitted to the side of the other end can be detected by a component (for example, the calculation unit to be described later) included in the main body of the electrolyte analysis device. Thus, a concentration of the first ion species contained in the electrolyte can be calculated based on a potential difference between the reference potential and the first potential. Also, a concentration of the second ion species contained in the electrolyte can be calculated based on a potential difference between the reference potential and the second potential.

In a third aspect, an electrolyte analysis device of the present disclosure is an electrolyte analysis device for measuring a concentration ratio between a first ion species and a second ion species contained in an electrolyte, the electrolyte analysis device comprising:

an electrolyte analysis test strip; and a main body, wherein the electrolyte analysis test strip includes a substrate extending in one direction from one end to an other end, an ion sensitive electrode that is provided in a specific region on a side of the one end in the one direction on a main surface of the substrate, and is for measuring a concentration of ions, a main extraction electrode extending from the ion sensitive electrode to a side of the other end, a solution detection electrode that is provided in a proximal region located between the specific region and the other end in the one direction on the main surface in a manner separated from the main extraction electrode, and is for detecting whether or not the solution detection electrode is in contact with the electrolyte, and an auxiliary extraction electrode extending from the solution detection electrode to the side of the other end in a manner separated from the main extraction electrode, wherein the electrolyte contains a first ion species and a second ion species different from each other, the ion sensitive electrode includes a first ion sensitive electrode and a second ion sensitive electrode that are provided in the specific region in a manner separated from each other, the first ion sensitive electrode producing, when brought into contact with the electrolyte, a first potential corresponding to a concentration of the first ion species, the second ion sensitive electrode producing, when brought into contact with the electrolyte, a second potential corresponding to a concentration of the second ion species, and the main extraction electrode includes a first main extraction electrode and a second main extraction electrode that respectively extend from the first ion sensitive electrode and the second ion sensitive electrode to the side of the other end in a manner separated from each other, and the main body includes a connector including contact electrodes that correspond to and come into contact with the first main extraction electrode, the second main extraction electrode, and the auxiliary extraction electrode, respectively, when the side of the other end of the electrolyte analysis test strip is inserted in the connector, a solution detection processing unit that detects, via the auxiliary extraction electrode, that the electrolyte is brought into contact with the solution detection electrode when the electrolyte comes into contact with the solution detection electrode in a mounted state in which the side of the other end of the electrolyte analysis test strip is inserted in the connector, and a calculation unit that calculates, triggered by a detection of the electrolyte coming into contact with the solution detection electrode, a concentration ratio between the first ion species and the second ion species contained in the electrolyte, based on a potential difference between the first potential obtained through the first main extraction electrode and the second potential obtained through the second main extraction electrode.

In the electrolyte analysis device of the present disclosure, when using the electrolyte analysis device, the user inserts the side of the other end of the electrolyte analysis test strip in the connector of the main body (this is referred to as "mounting operation"). By this mounting operation, the contact electrodes of the connector make contact with corresponding ones of the first main extraction electrode, the second main extraction electrode, and the auxiliary extraction electrode of the electrolyte analysis test strip. To perform measurement in this state ("mounted state"), the user brings the electrolyte into contact with the electrolyte analysis test strip so as to integrally cover from the one end to the proximal region in which the solution detection electrode is provided, including the specific region in which the first and second ion sensitive electrodes are provided (this is referred to as "electrolyte contact operation" as described above). The electrolyte is thereby brought into contact with the first and second ion sensitive electrodes and the solution detection electrode so as to integrally cover them. This allows the solution detection processing unit included in the main body to detect, via the auxiliary extraction electrode (and the corresponding contact electrode of the connector), the contact of the electrolyte with the solution detection electrode. For example, the impedances between the solution detection electrode and the first ion sensitive electrode and between the solution detection electrode and the second ion sensitive electrode decrease. This decrease in impedance can be detected by the solution detection processing unit via the first and second main extraction electrodes and the auxiliary extraction electrode (and the corresponding contact electrodes of the connector). When a contact of the electrolyte with the solution detection electrode is detected, it is determined that the electrolyte is in contact with the first and second ion sensitive electrodes so as to integrally cover the first and second ion sensitive electrodes, under an assumption that the electrolyte contact operation is performed to cause the electrolyte to contact the electrolyte analysis test strip so as to integrally cover from the one end to the proximal region. Then, triggered by a detection of contact of the electrolyte with the first and second ion sensitive electrodes, the calculation unit calculates a concentration ratio between the first ion species and the second ion species contained in the electrolyte based on a potential difference between the first potential obtained through the first main extraction electrode and the second potential obtained through the second main extraction electrode. By performing a measurement in a state confirmed that the electrolyte is in contact with the first and second ion sensitive electrodes so as to integrally cover the first and second ion sensitive electrodes as described above, reliability of measurement result (the concentration ratio between the first ion species and the second ion species) can be enhanced.

In the electrolyte analysis device of one embodiment, the main body further includes a mounting detection unit that detects the mounted state in which the side of the other end of the electrolyte analysis test strip is inserted in the connector being established, and a power control unit that, triggered by a detection of the mounted state being established, turns on a power of the main body.

Here, "turn on a power of the main body" means supplying an electrical power to the units of the main body (including the solution detection processing unit and the calculation unit) to make the units operable. In a state where the power of the main body has been turned off, the mounting detection unit is operable. However, the other units than the mounting detection unit of the main body are not supplied with any electrical power and are not operable.

In the electrolyte analysis device of this one embodiment, when using the electrolyte analysis device, the user performs the mounting operation of inserting the side of the other end of the electrolyte analysis test strip in the connector of the main body. Then, the mounting detection unit detects that the side of the other end of the electrolyte analysis test strip has been inserted in the connector to establish the mounted state. Triggered by a detection of the mounted state being established, the power control unit turns on a power of the main body. Thus, when using the electrolyte analysis device, the user need not perform an action of turning on the power of the main body besides performing the mounting operation. This improves user-friendliness. Moreover, there is no need to provide a power switch to the main body.

In the electrolyte analysis device of one embodiment, the electrolyte analysis test strip includes a conductive layer that is provided on the side of the other end in the one direction in a manner separated from the first main extraction electrode, the second main extraction electrode, and the auxiliary extraction electrode, the connector includes an additional contact electrode that comes into contact with the conductive layer when the side of the other end of the electrolyte analysis test strip is inserted in the connector, and the mounting detection unit detects that the mounted state is established in response to the additional contact electrode of the connector coming into contact with the conductive layer.

In the electrolyte analysis device of this one embodiment, the mounting detection unit detects that the mounted state has been established in response to the additional contact electrode of the connector coming into contact with the conductive layer. This allows a detection of the mounted state being established by a simple configuration.

In the electrolyte analysis device of one embodiment, the main body includes an outer peripheral wall that houses a component included in the main body, and the outer peripheral wall exposes a display screen for displaying information controlled by the calculation unit and a slot for the connector to receive the electrolyte analysis test strip, while covering a rest region other than regions occupied by the display screen and the slot with no component for operation.

The "component included in the main body" may include the connector, the solution detection processing unit, the calculation unit, the mounting detection unit, the power control unit, and a display unit constituting the display screen.

The "component for operation" means a component such as a button switch for inputting an instruction by a user.

In the electrolyte analysis device of this one embodiment, the main body has an outer peripheral wall that houses the components included in the main body. The outer peripheral wall exposes the display screen for displaying information controlled by the calculation unit and the slot for the connector to receive the electrolyte analysis test strip, while covering a rest region other than regions occupied by the display screen and the slot with no component for operation. Since no component for operation is provided on the outer peripheral wall of the main body as described above, a configuration of the main body is simplified.

In a fourth aspect, an electrolyte analysis method of the present disclosure is an electrolyte analysis method for measuring a concentration ratio between the first ion species and the second ion species contained in the electrolyte using the electrolyte analysis device of the third aspect, wherein the calculation unit of the electrolyte analysis device is configured to wait, triggered by the detection of the electrolyte coming into contact with the solution detection electrode, until the potential difference between the first potential obtained through the first main extraction electrode and the second potential obtained through the second main extraction electrode converges, to perform a calibration based on a converged potential difference between the first potential and the second potential, and to calculate the concentration ratio between the first ion species and the second ion species using a parameter obtained by the calibration, and the electrolyte analysis method includes:

inserting the side of the other end of the electrolyte analysis test strip in the connector to establish the mounted state; and in the mounted state, performing an operation of bringing a standard solution containing the first ion species and the second ion species at a predetermined concentration ratio into contact with the main surface of the electrolyte analysis test strip so as to integrally cover from the one end to the proximal region to cause the solution detection processing unit to detect, via the auxiliary extraction electrode, that the electrolyte has come into contact with the solution detection electrode, and further causing, triggered by the detection of the electrolyte coming into contact with the solution detection electrode, the calculation unit to perform the calibration based on the potential difference between the first potential and the second potential obtained for the standard solution.

Here, "calibration" means a processing of obtaining a parameter necessary for calculating a concentration ratio between the first ion species and the second ion species for a measurement target solution based on a potential difference between the first and second potentials obtained for a standard solution whose concentration ratio is known.

In the electrolyte analysis method of the present disclosure, the user inserts the side of the other end of the electrolyte analysis test strip in the connector to establish the mounted state, and, in the mounted state, performs an operation of bringing the standard solution, as an electrolyte, containing the first ion species and the second ion species at a predetermined concentration ratio into contact with the main surface of the electrolyte analysis test strip so as to integrally cover from the one end to the proximal region. This causes the solution detection processing unit to detect via the auxiliary extraction electrode that the electrolyte has come into contact with the solution detection electrode, and the calculation unit to perform, triggered by the detection of contact of the standard solution with the solution detection electrode, the calibration based on the potential difference between the first and second potentials obtained for the standard solution. Performing the calibration in a state confirmed that the standard solution is in contact with the first and second ion sensitive electrodes as described above can enhance reliability of the calibration. In addition, at a start of calibration, the user need not perform an action such as turning on a calibration switch besides performing the operation of bringing the standard solution into contact. This improves user-friendliness. Moreover, there is no need to provide a calibration switch to the main body.

In an electrolyte analysis method of one embodiment,
the electrolyte analysis device includes
a mounting detection unit that detects the mounted state in which the side of the other end of the electrolyte analysis test strip is inserted in the connector being established, and
a power control unit that, triggered by a detection of the mounted state being established, turns on a power of the main body, and
the electrolyte analysis method further includes
causing the mounting detection unit to detect, by performing a mounting operation of inserting the side of the other end of the electrolyte analysis test strip in the connector of the main body, that the mounted state in which the side of the other end of the electrolyte analysis test strip is inserted in the connector has been established, and causing, triggered by the detection of the mounted state being established, the power control unit to turn on the power of the main body.

In the electrolyte analysis method of this one embodiment, at a start of using the electrolyte analysis device, the user performs the mounting operation, that is, inserting the side of the other end of the electrolyte analysis test strip in the connector of the main body. This causes the mounting detection unit to detect the mounted state being established, and the power control unit to turn on, triggered by the detection of the mounted state being established, the power of the main body. In this case, at the start of using the electrolyte analysis device, the user need not perform an action of turning on the power of the main body besides performing the mounting operation. This improves user-friendliness. Moreover, there is no need to provide a power switch to the main body.

In an electrolyte analysis method of one embodiment,
the calculation unit of the electrolyte analysis device is configured to determine, subsequently to the calibration, whether the potential difference between the first potential obtained through the first main extraction electrode and the second potential obtained through the second main extraction electrode shows a change exceeding a predetermined threshold value, to wait, triggered by the potential difference between the first potential and the second potential showing a change exceeding the threshold value, until the potential difference between the first potential and the second potential converges again, and to calculate a concentration ratio between the first ion species and the second ion species using the parameter obtained by the calibration based on the converged potential difference between the first potential and the second potential, and
the electrolyte analysis method includes
after causing the calculation unit to perform the calibration, performing an operation of bringing a measurement target solution into contact with the main surface of the electrolyte analysis test strip so as to integrally cover from the one end to the proximal region to cause a change in a potential difference between the first potential and the second potential exceeding the threshold value, and causing the calculation unit to calculate the concentration ratio using the parameter obtained by the calibration based on a potential difference between the first potential and the second potential obtained for the measurement target solution.

In the electrolyte analysis method of this one embodiment, at a start of measurement after the calculation unit performing the calibration, the user performs an operation of bringing the measurement target solution into contact with the main surface of the electrolyte analysis test strip so as to integrally cover from the one end to the proximal region to cause such a change in the potential difference between the first and second potentials that exceeds the threshold value. The calculation unit determines whether the potential difference between the first and second potentials obtained through the first and second main extraction electrodes shows a change exceeding the predetermined threshold value. When the potential difference between the first and second potentials shows such a change exceeding the threshold value, it is determined that the standard solution in contact with the first and second ion sensitive electrodes has been replaced with the measurement target solution. Then, triggered by the potential difference between the first and second potentials showing a change exceeding the threshold value, the calculation unit waits until the potential difference between the first and second potentials converges again, and calculates a concentration ratio between the first ion species and the second ion species using a parameter obtained by the calibration based on the converged potential difference between the first and second potentials. By calculating the concentration ratio in a state confirmed that the standard solution in contact with the first and second ion sensitive electrodes has been replaced with the measurement target solution as described above, reliability of the calculated concentration ratio can be enhanced. In addition, at a start of measuring the measurement target solution, the user need not perform an action such as turning on a measurement switch besides performing the operation of bringing the measurement target solution into contact. This improves user-friendliness. Moreover, there is no need to provide a measurement button switch to the main body.

In a fifth aspect, an electrolyte analysis device of the present disclosure is an electrolyte analysis device for measuring a concentration of ions contained in an electrolyte, the electrolyte analysis device comprising:

an electrolyte analysis test strip; and a main body, wherein the electrolyte analysis test strip includes a substrate extending in one direction from one end to an other end, an ion sensitive electrode that is provided in a specific region on a side of the one end in the one direction on a main surface of the substrate, and is for measuring a concentration of the ions, a main extraction electrode extending from the ion sensitive electrode to a side of the other end, a solution detection electrode that is provided in a proximal region located between the specific region and the other end in the one direction on the main surface in a manner separated from the main extraction electrode, and is for detecting whether or not the solution detection electrode is in contact with the electrolyte, and an auxiliary extraction electrode extending from the solution detection electrode to the side of the other end in a manner separated from the main extraction electrode, and the main body includes a connector including contact electrodes that correspond to and come into contact with the main extraction electrode and the auxiliary extraction electrode, respectively, when the side of the other end of the electrolyte analysis test strip is inserted in the connector, a solution detection processing unit that detects, via the auxiliary extraction electrode, that the electrolyte is brought into contact with the solution detection electrode when the electrolyte comes into contact with the solution detection electrode in a mounted state in which the side of the other end of the electrolyte analysis test strip is inserted in the connector, and a calculation unit that calculates, triggered by a detection of the electrolyte coming into contact with the solution detection electrode, a concentration of ions contained in the electrolyte based on a potential obtained through the main extraction electrode.

In the electrolyte analysis device of one embodiment, the electrolyte analysis test strip includes a reference electrode that is provided in the specific region in a manner separated from the ion sensitive electrode, and produces a reference potential when brought into contact with the electrolyte, and a reference extraction electrode extending from the reference electrode to the side of the other end in a manner separated from the main extraction electrode.

As is apparent from the above, according to the electrolyte analysis test strip of the present disclosure, whether or not the electrolyte is in contact with the ion sensitive electrode can be determined. In addition, according to the electrolyte analysis device and the electrolyte analysis method of the present disclosure, the concentration of ions contained in the electrolyte can be measured in a state confirmed that the electrolyte is in contact with the ion sensitive electrode.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. An electrolyte analysis device comprising:

an electrolyte analysis test strip; and a main body, wherein the electrolyte analysis test strip includes a substrate extending in one direction from one end to another end, first and second ion sensitive electrodes provided in a specific region that is defined closer to the one end than the other end in the one direction on a main surface of the substrate, the first and second ion sensitive electrodes being configured to respectively generate first and second potentials corresponding to concentrations of first and second ions species contained in an electrolyte;

first and second main extraction electrodes respectively extending from the first and second ion sensitive electrodes toward the other end and configured to electrically draw out the potentials of the corresponding ion sensitive electrodes;

a solution detection electrode provided between the specific region and the other end in the one direction on the main surface, and configured to detect whether or not the solution detection electrode is in contact with the electrolyte; and an auxiliary extraction electrode extending from the solution detection electrode toward the other end in a manner separated from the first and second main extraction electrodes and configured to electrically draw out a potential of the solution detection electrode, wherein the main body includes a connector including contact electrodes that respectively correspond to and come into contact with the first main extraction electrode, the second main extraction electrode, and the auxiliary extraction electrode, when the other end of the electrolyte analysis test strip is inserted in the connector, a solution detection processing unit configured to detect, via the auxiliary extraction electrode, that the electrolyte has come into contact with the solution detection electrode when the electrolyte comes into contact with the solution detection electrode in a mounted state in which the other end of the electrolyte analysis test strip is inserted in the connector; and a calibration processing unit configured, triggered by a detection that a standard solution as the electrolyte has come into contact with the solution detection electrode, to start determining whether a potential difference between the first and second potentials obtained through the first and second main extraction electrodes becomes constant, and when the potential difference becomes constant within a predetermined calibration period, to perform a calibration based on the constant potential difference to obtain a parameter;

the standard solution contains the first ion species and the second ion species at a predetermined concentration ratio; and the main body further includes a calculation unit configured to calculate a concentration ratio between the first ion species and the second ion species contained in a measurement target solution as the electrolyte using the parameter obtained by the calibration.

2. The electrolyte analysis device according to claim 1, wherein the main body further includes a mounting detection unit that detects the mounted state in which the other end of the electrolyte analysis test strip is inserted in the connector being established, and a power control unit that, triggered by a detection that the mounted state has been established, turns on a power of the main body.

3. The electrolyte analysis device according to claim 2, wherein the electrolyte analysis test strip includes a conductive layer provided in a region that is defined closer to the other end that the one end in the one direction in a manner separated from the first main extraction electrode, the second main extraction electrode, and the auxiliary extraction electrode, the connector includes an additional contact electrode that comes into contact with the conductive layer when the other end of the electrolyte analysis test strip is inserted in the connector, and the mounting detection unit detects that the mounted state is established in response to the additional contact electrode of the connector coming into contact with the conductive layer.

4. The electrolyte analysis device according to claim 1, wherein the main body includes an outer peripheral wall that houses a component included in the main body, and the outer peripheral wall exposes a display screen for displaying information controlled by the calculation unit and a slot for the connector to receive the electrolyte analysis test strip, while covering, without any operational component, a remaining region other than regions occupied by the display screen and the slot.

5. An electrolyte analysis method using the electrolyte analysis device according to claim 1, wherein the electrolyte analysis method includes:

inserting the other end of the electrolyte analysis test strip in the connector to establish the mounted state;

in the mounted state, performing an operation of bringing the standard solution into contact with the main surface of the electrolyte analysis test strip so as to integrally cover from the one end to the solution detection electrode to cause the solution detection processing unit to detect, via the auxiliary extraction electrode, that the electrolyte has come into contact with the solution detection electrode;

causing the calibration processing unit, triggered by a detection that the standard solution has come into contact with the solution detection electrode, to start determining whether the potential difference between the first and second potentials becomes constant, and, when the potential difference becomes constant within the calibration period, to perform a calibration based on the constant potential difference to obtain a parameter; and subsequently, performing an operation of bringing a measurement target solution as the electrolyte into contact with the portion of the main surface of the electrolyte analysis test strip so as to integrally cover from one end to the solution detection electrode, thereby causing the calculation unit to calculate a concentration ratio between the first ion species and the second ion species contained in the measurement target solution using the parameter obtained by the calibration.

6. The electrolyte analysis method according to claim 5, wherein the electrolyte analysis device includes a mounting detection unit that detects the mounted state in which the other end of the electrolyte analysis test strip is inserted in the connector being established, and a power control unit that, triggered by a detection of the mounted state being established, turns on a power of the main body, and the electrolyte analysis method further includes performing a mounting operation of inserting the side of the other end of the electrolyte analysis test strip in the connector of the main body to cause the mounting detection unit to detect that the mounted state in which the other end of the electrolyte analysis test strip is inserted in the connector has been established, and cause, triggered by the detection of the mounted state being established, the power control unit to turn on the power of the main body.

7. The electrolyte analysis method according to claim 5, wherein the calculation unit of the electrolyte analysis device is configured to start determining, subsequently to the calibration, whether the potential difference between the first potential and the second potential shows a change exceeding a predetermined threshold value, to start determining, triggered by the potential difference between the first potential and the second potential showing a change exceeding the threshold value, whether the potential difference between the first potential and the second potential becomes constant, and, when the potential difference becomes constant within a predetermined measurement period, to calculate a concentration ratio between the first ion species and the second ion species contained in the measurement target solution using the parameter obtained by the calibration based on the constant potential difference between the first potential and the second potential, and the electrolyte analysis method includes after causing the calibration processing unit to perform the calibration, performing an operation of bringing the measurement target solution into contact with the main surface of the electrolyte analysis test strip so as to integrally cover from the one end to the solution detection electrode to cause a change in a potential difference between the first potential and the second potential exceeding the threshold value, and causing the calculation unit to (i) start determining whether the potential difference between the first potential and the second potential shows a change exceeding the threshold value, (ii) start determining, triggered by the potential difference between the first potential and the second potential showing a change exceeding the threshold value, whether the potential difference between the first and second potentials becomes constant, and (iii) when the potential difference becomes constant within the predetermined measurement period, calculate the concentration ratio using the parameter obtained by the calibration based on the constant potential difference between the first potential and the second potential.

* * * * *